United States Patent [19]

D'Arrigo et al.

[11] Patent Number: 5,848,394
[45] Date of Patent: Dec. 8, 1998

[54] METHOD AND SYSTEM FOR PRODUCING A WORK BREAKDOWN STRUCTURE FOR A PROJECT

[75] Inventors: Christopher S. D'Arrigo, Williamsville; Dirk E. Smith, Cheektowaga, both of N.Y.

[73] Assignee: Leonard & Caroline White, E. Amherst, N.Y.

[21] Appl. No.: 715,635

[22] Filed: Sep. 18, 1996

[51] Int. Cl.⁶ ........................................... G07C 1/00
[52] U.S. Cl. ..................................... 705/8; 707/100
[58] Field of Search .............................. 705/8, 11, 9, 22; 707/100, 102, 205

[56] References Cited

U.S. PATENT DOCUMENTS

| | | | |
|---|---|---|---|
| 5,233,513 | 8/1993 | Doyle | 354/401 |
| 5,303,170 | 4/1994 | Valko | 364/578 |
| 5,381,332 | 1/1995 | Wood | 364/401 |
| 5,414,843 | 5/1995 | Nakamura et al. | 395/600 |
| 5,446,895 | 8/1995 | White et al. | 395/650 |

Primary Examiner—Thomas Peeso
Attorney, Agent, or Firm—Marianne Fuierer; Howard M. Ellis

[57] ABSTRACT

An automated system and method for producing a work breakdown structure for a project, such as a software development project. The resulting work breakdown structure provides a common framework for communicating cost, scope and schedule information relating to the project. The system includes a function point component list which identifies the files and tables which represent the product to be developed for the project or projects. The function point component list also contains information about the elementary transactions by which each file or table is modified or maintained. The system further includes a work breakdown structure template file, in which a list of identifiable tasks and resources required to accomplish a project is maintained. Using the function point component list and the work breakdown structure template file, the system generates an electronic work breakdown structure output file in which information about the total work required to accomplish the objectives of a project is stored. The information contained in the electronic work breakdown structure output file can be extracted in a user defined format and displayed for a user.

34 Claims, 7 Drawing Sheets

| PREFIX | SUFFIX | DESCRIPTION | QTY | TYPE | ACTION | FTR1 | DET1 | RATE |
|---|---|---|---|---|---|---|---|---|
| CUSTOMER | 002000 | CUSTOMER MASTER FILE | 1 | EIF | ADD | 6+ | 51+ | HIGH |
| ILF00010 | 001000 | DISTRIBUTORS | 1 | ILF | CHANG | 1 | 50< | LOW |
| ILF00070 | 001000 | TAX CODES | 1 | EIF | CHANG | 1 | 19 | LOW |
| INVENTORY | 003000 | INVENTORY ITEMS MASTER FILE | 1 | ILF | ADD | 6+ | 51+ | HIGH |
| INVOICE | 001000 | CUSTOMER INVOICES | 1 | ILF | ADD | 6+ | 51+ | HIGH |

FUNCTION POINT COMPONENT FILE

Fig-2

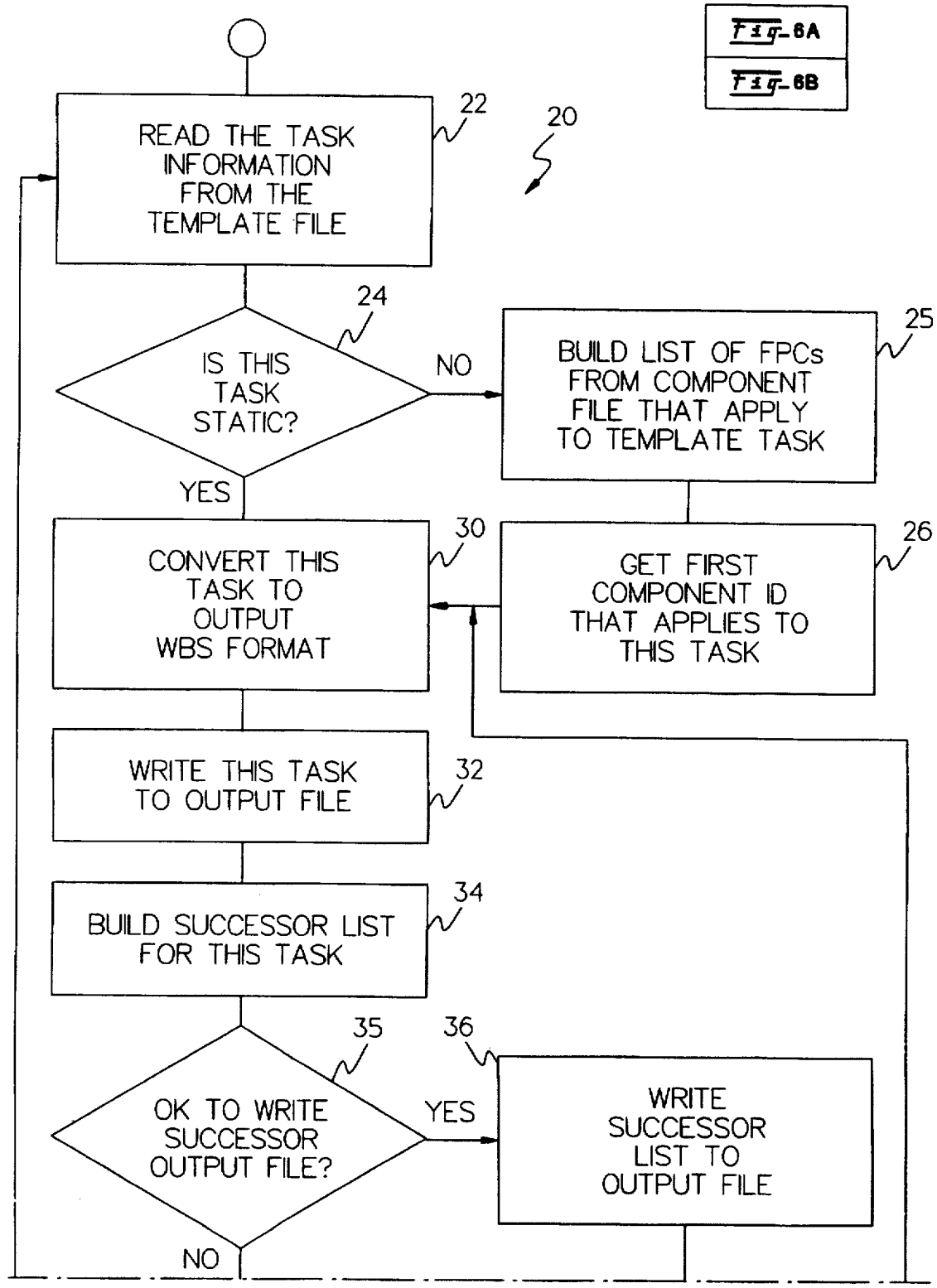

METHOD AND SYSTEM FOR PRODUCING A WORK BREAKDOWN STRUCTURE FOR A PROJECT

TECHNICAL FIELD

The present invention relates generally to project management systems and specifically to computerized systems for producing project management tools.

BACKGROUND OF THE INVENTION

A work breakdown structure (WBS) is a task oriented, hierarchical listing of activities which subdivides a project into manageable work packages, components or tasks which represent the total work to be accomplished in order to achieve the final objectives of a project. Each descending level of the hierarchy in the work breakdown structure represents an increasingly detailed definition of the project objective.

One type of project to which the present invention may be applied is a software development project. Software development projects typically have an overall objective of producing an application software package, such as an accounting or word processing application. Many tasks must be performed to accomplish the objective of developing such a software application package. One of these tasks is building the files which will contain the programs and data required to implement the application. The task of building a file can be further divided into sub tasks such as: designing the file, approving the file and building the file. Each of these tasks must be performed in a specified order and each may require project resources, such as computer programming personnel, to accomplish.

It is useful for a program manager to have available a tool for collecting and displaying information relating to the tasks which must be performed to accomplish the objectives of a project. A work breakdown structure provides such a tool. A work breakdown structure provides a common framework for communicating cost, scope and schedule information relating to a project. Work breakdown structures facilitate the management of a project by allowing responsibility for tasks to be allocated, work to be monitored and resources to be assigned. The technique of utilizing a work breakdown structure to assist in managing a project is well known to those skilled in the art of project management.

Function points are a measure of the size of computer applications and the projects that build them. The size is measured from a functional, or user, point of view and is independent of the computer language, development methodology, technology or capability of the project team used to develop the application. Function Points give software engineering researchers a way of sizing software through the analysis of the implemented functionality of a system from the user's point of view.

Release 4.0 of the International Function Point Users Group (IFPUG) "Function Point Counting Practices Manual" describes the technique of function point counting and is hereby incorporated by reference. U.S. Pat. No. 5,446,895 to White et al also describes function point analysis and discloses a system for performing function point analysis and creating a function point component file and is hereby incorporated by reference.

The present invention provides a means for combining and integrating function point information and project task information to produce a single work breakdown structure output file whose contents can be accessed, organized, and displayed by a user in a variety of user formats and records.

U.S. Pat. No. 5,414,843 to Nakamura et al. describes a method and system for generating a project schedule using weighted work processes. The described invention relies upon three primary files: a work procedure file which stores information about each required work process, or collection of tasks; a product file, which stores information about the product to be produced; and a schedule file. These files are used to automatically produce a schedule table for producing a product. However, this reference does not utilize the function point component technique. Further, it does not address the problem of consolidating common tasks between different products.

U.S. Pat. No. 5,303,170 provides for creation of tools for computerized process modeling and project planning. However, this reference requires extensive input from a computer operator to enter task information for each individual task. This system results in increased time, cost and potential for human error.

U.S. Pat. No. 5,414,843 discloses a method and system for generating a project schedule using weighted work processes. However, the disclosed method and system contain certain limitations. For example, common tasks cannot be consolidated. In addition, resources cannot be allocated to tasks.

SUMMARY OF THE INVENTION

Accordingly, it is a principal object of the invention to provide a system for generating a work breakdown structure for a project comprising in combination means for storing function point component information, means for storing work task information and processing means for combining the function point component information and the work task information. The system produces an output comprising combined function point component information and work task information, and includes means for storing the output. The system may also include means for displaying the output to an operator.

The means for storing work task information, function point component information and the output can be one or more files residing in the memory of a computer. The means for storing work task information and the means for storing function point component information can include means for storing information common to the work task information and the function point component information such as function point component type and function point component action. The work task information stored in the means for storing work task information can include resource information such as resource type and resource category.

It is a further object of the invention to provide a system directed by computer hardware for producing a work breakdown structure for a project comprising one or more files for storing project task information, one or more files for storing function point component information, processing means for combining project task information stored in the one or more files for storing project task information with function point component information stored in the one or more files for storing function point component information.

The system produces an output comprising combined project task information and function point component information. The processing means are coupled to the one or more files for storing project task information and the one or more files for storing function point component information. The system further comprises one or more files for storing the output and may include means for displaying the output to an operator. The processing means are coupled to the one or more files for storing the output.

The system may further include means for storing information at the application level. An application comprises a collection of automated procedures and data supporting business objectives. In this case, the files for storing the output are coupled to the means for storing information at the application level.

The processing means may include means for converting a format of the files for storing the output to a format of the means for storing information at the application level.

It is a further object of the invention to provide a method for producing a work breakdown structure for a project comprising the steps of: a) storing function point component information, b) storing project task information separately from the stored function point component information, c) combining the function point component information with the project task information to produce an output comprising combined function point component and project task information, and d) storing the output.

BRIEF DESCRIPTION OF THE DRAWINGS

For a further understanding of the invention, as well as its characterizing features, reference should now be made to the accompanying drawings wherein:

FIG. 2 shows an example of a file structure for the Function Point Component file as it appears to a user.

FIGS. 6, 6A & 6B are detailed flow charts of the Process Task step in the sequence depicted in FIG. 5.

DESCRIPTION OF THE PREFERRED EMBODIMENTS

Figure 1:
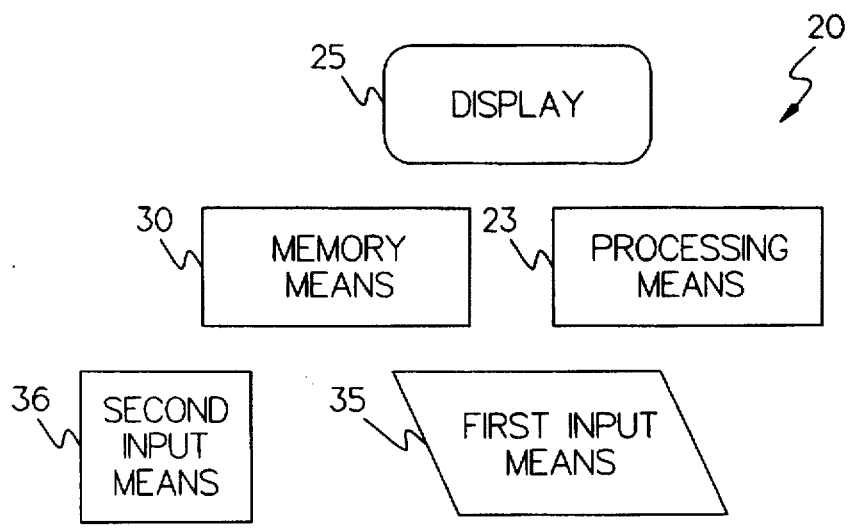
FIG. 1 is a block diagram illustrating a high level configuration of a system for producing a work breakdown structure in accordance with an embodiment of the present invention.

FIG. 1 diagrammatically illustrates the basic configuration of a system for producing a work breakdown structure for a project in accordance with the preferred embodiment of the present invention. The system 20 comprises processing means 23, means for storing information 30, display means 25 and input means 35 and 36.

Processing means 23 can be any type of data processor, or central processing unit (CPU) such as that provided by any commercially available personal computer, microcomputer, mainframe computer or a minicomputer running a corresponding operating system software program. Processing means 23 can also be of custom design and may run customized operating system software. The invention is not dependent on processor manufacturer, computer manufacturer or operating system software manufacturer and may be readily adapted by known means to run in any system.

In the preferred embodiment processing means 23 is provided by a commercially available IBM compatible personal computer comprising an Intel® 486 processor with a 66 MHZ clock speed, 8 MBYTES Random Access Memory (RAM),500 MByte hard disk drive, high density diskette drive, keyboard, mouse and super video graphics adapter. The commercially available computer employed in the preferred embodiment further includes Microsoft WINDOWS™ version 3.1 operating system software. Other commercially available operating systems, such as MS-DOS®, WINDOWS 95™, Unix, etc. may be employed in conjunction with a compatible processing means to comprise system 20.

Means for storing information 30 can be any computer readable storage means and may be comprised of any type of Random Access Memory (RAM), Read Only Memory (ROM), hard disk, floppy disk, magnetic, optical, charge coupled, or any other computer readable storage medium or device or devices, used singly or in combination. In the preferred embodiment means for storing information 30 includes a hard disk having a storage capacity of 500 Mbytes in combination with 16 Mbytes of random access memory, and a Read Only Memory (ROM) containing a Basic Input Output System (BIOS) program compatible with processing means 23.

The first and second input means 35 and 36 of the preferred embodiment are a standard personal computer keyboard and a mouse. Use of a mouse is recommended for ease of operator input but is not required.

Figure 1A:
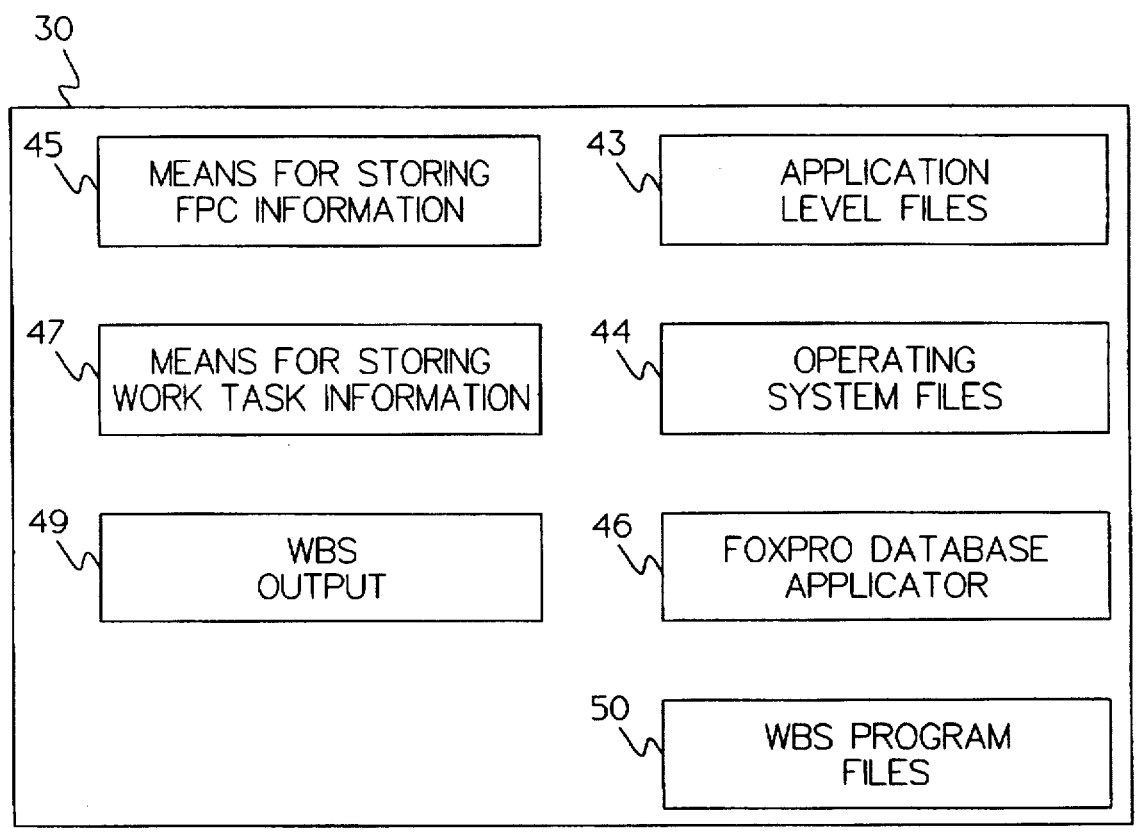
FIG. 1A shows typical contents of the means for storing information shown in FIG. 1.

FIG. 1A depicts the contents of means for storing information 30. The physical placement on the diagram of the components depicted in FIG. 1A, as well as their relationship to each other, is for illustrative purposes only and does not imply any particular physical or logical allocation of memory space.

Means for storing information 30 includes means for storing function point component (FPC) information 45. In the preferred embodiment means for storing function point component information 45 is a file designated as a Function Point Component File. For purposes of this specification the unmodified term file means an organized collection of data records stored on a computer readable device.

Means for storing information 30 further includes means for storing work task information 47. In the preferred embodiment means for storing work task information 47 comprises a file designated as a Work Breakdown Structure (WBS) Template File.

Means for storing information 30 further includes means for storing combined function point component information and work task information 49. In the preferred embodiment means for storing combined function point component information and work task information 49 is a file designated as WBS Output File or simply Output file.

Further included in means for storing information 30 are means for storing operating system files 44, means for storing information at the application level 43, and means for storing WBS program files 50. Files 44, 43, and 50 may include files having one or more of three general file definitions. The first definition is for the unmodified use of the term file as provided above. Further definitions include the modified term 'data file' which is a file containing data representations other than records, and the modified term 'program file' which is a file containing instructions to be executed by a processing means such as processing means 23.

Operating system files are those files which provide basic operating features and capabilities to a computer and are normally supplied as part of any commercially available computer. Operating system files can include files, data files and program files. For example, the MS-DOS® and Microsoft WINDOWS™ operating systems are comprised of operating system files.

Application level files are those files which comprise application level software. An application, and application level software, comprises a collection of automated procedures and data supporting business objectives.

In the preferred embodiment of the present invention the application level software Microsoft Project® is utilized to provide a means for a user to create and store work task information in means for storing work task information 47. Microsoft Project® is a readily available commercial software product and is accompanied by manufacturer's instructions for its use and application. However, the invention is not restricted to the use of Microsoft Project® to create and store work task information. Any application level software which allows a user to create work task information and store the work task information in means for storing work task information may be used in the present invention.

Further included in the preferred embodiment of the present invention is the application level software Productivity Manager™. Productivity Manager™ is a commercially available application which can be obtained from Productivity Management Group, Inc. Of Williamsville, N.Y., along with detailed instructions for its use. Productivity Manager™ provides a convenient means for a user to create function point component information and store the information in the means for storing function point component information 45. However, the invention is not limited to the use of Productivity Manager™. Any commercially available application which allows a user to create function point component information and store the information in means for storing function point component information 45 can be utilized in the present invention.

Means for storing WBS program files 50 contains the WBS program files which are instructions and data for directing processing means 23 to carry out the steps required to implement the present invention. In the preferred embodiment the WBS program files are developed using the commercially available, and well known Microsoft Foxpro® database application software and the Microsoft Foxpro® database programming language. However, the WBS program files may be developed using other programming languages and application level software while remaining within the scope of the present invention.

Returning to FIG. 1, display means 25 can be any commercially available display device, or a custom designed or proprietary display device which is compatible with the commercial computer system providing processing means 23. Display means 25 preferably is a computer monitor having as a minimum Video Graphics Adapter (VGA) capability and a resolution of at least 640×480 pixels per square inch. In the preferred embodiment display means 25 is a commercially available 21" NEC MultiSync XE 21 monitor used in conjunction with a Diamond Video 2000 graphics adapter.

Input means 35 and 36 provide a means for a user to communicate with and enter data into system 20. In the preferred embodiment input means 35 comprises a keyboard and input means 36 comprises a mouse. Other input means including scanners, light pens, touch screens, modems, etc. may be utilized and remain within the scope of the present invention.

FIG. 2 shows an example of the file structure and content of a typical Function Point Component File 60 as it appears to a user. A function point component is defined to be a grouping of data or control information or a basic transaction in a system, which provides the lowest level of functionality in a system from the user's perspective. Function Point Component File 60 is a file in which a list of function point components, and information associated with each function point component, is stored. Function Point Component File 60 resides in means for storing function point component information 45.

In the preferred embodiment of the present invention Function Point Component File 60 is comprised of a list of function point component descriptions 65. Each function point component description in list 65 has further descriptive information associated with it. This descriptive information may include, but is not limited to the following: Prefix 66, Suffix 67, Description 65, Quantity 68, Type 69, Action 70, Field Type Referenced 1(FTR1) 71, Data Element Type 1(DET1) 72, and Rate 73.

Not all of these fields are required to implement the present invention. As a minimum requirement Function Point Component File 60 must also contain function point component Type field 69, and Action field 70.

In prefix field 66 an identifier for each function point component named in list 65 is provided. In suffix field 67 an identifier is provided for each function point component in list 65. Together, prefix 66 and suffix 67 provide a unique identifier for each function point component named in list 65. In description field 65 an alphanumeric description of the function point component is provided. Quantity field 68 contains an indication of the number of function point components of each description in list 65.

Type field 69 contains an indication of which of five function point component types: External Interface File (EIF), Internal Logical File (ILF), External Output (EO), External Input (EI), and External Inquiry (EQ) describes each entry in list 65. The definitions and functions of each of the five function point component types are provided in U.S. Pat. No. 5,446,895 to White et al.

Action field 70 contains information indicating whether the action to be performed on the function point component is Add, Change or Delete or No Action. File Types Referenced (FTR) field 71 indicates the number of file types referenced. The file types referenced are the number of internal logical files used during the processing of a transaction.

DET field 72 indicates the number of unique occurrences of data, which is also referred to as a data element type, or field. RATE field 73 indicates the relative size of the function point component.

Each of the above fields and their definitions are known in the art and described in U.S. Pat. No. 5,446,895 to White.

The Function Point Component List file is pre constructed by the user. As previously described, construction can be accomplished by means of any convenient database, productivity or project management software package such as Productivity Manager.™

Figure 3:
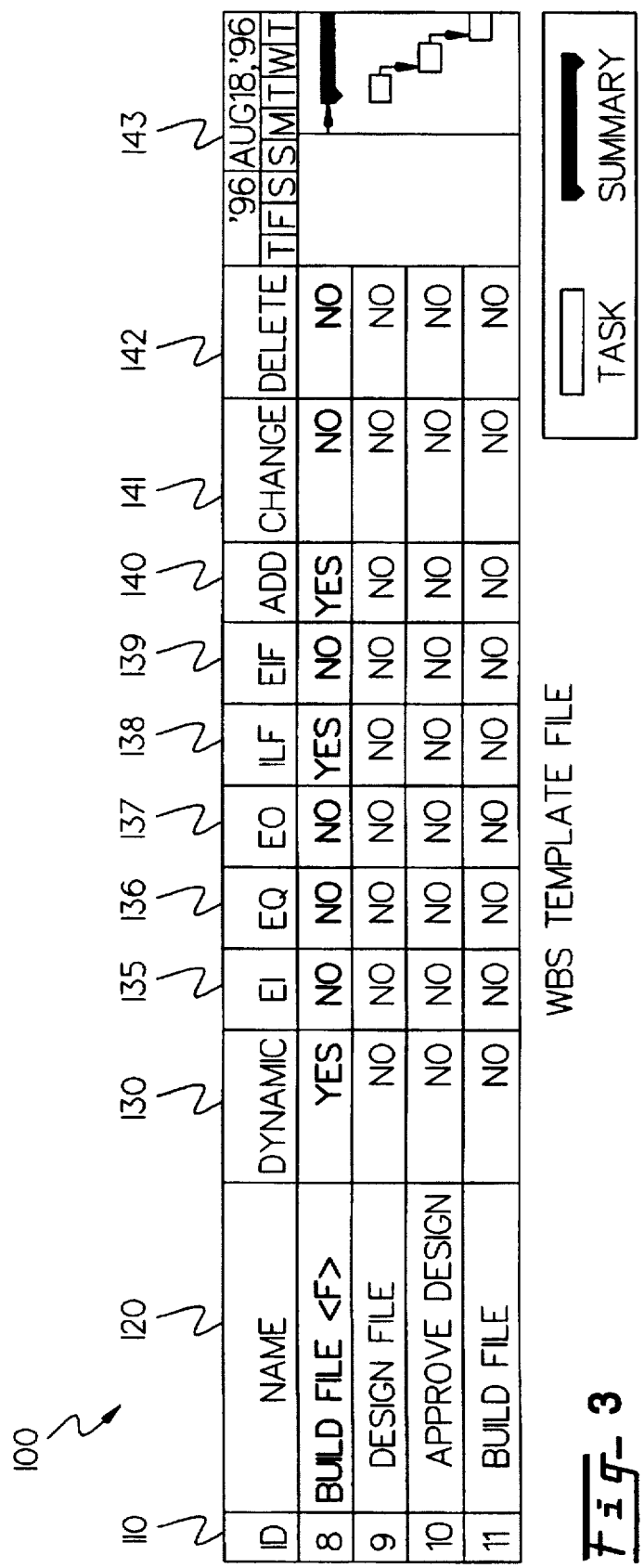
FIG. 3 shows an example of a file structure of a WBS Template File as it appear to a user.

FIG. 3 shows an example of the file structure of a WBS Template File 100 as it appears to a user. WBS template file 100 contains work task information which can include the following: a list of work task names as appear in column 120; unique task identifiers for each work task as appear in column 110; an indication, which may be pictorial, of all predecessor and successor tasks as well as other schedule information associated with the task, as appears in column 143; an indication whether the task is static or dynamic as appears in column 130; and an indication of all of the function point component types that apply to the task, if any, as appears in columns 135–139; and an indication of each action to be performed as appears in columns 140–142. The WBS template file may further include names of resources assigned to each task, the initials of the resource assigned to the task and a description of any deliverable items associated with the task.

For purposes of this specification a predecessor task associated with a given work task is defined to be a task which must be started before the given work task is started. A successor task associated with a given work task is defined to be a task which cannot be started until the given work task is started.

A static task is defined to be a task which occurs once in the lifetime of a project regardless of the frequency of occurrence of its function point components.

Figure 4:
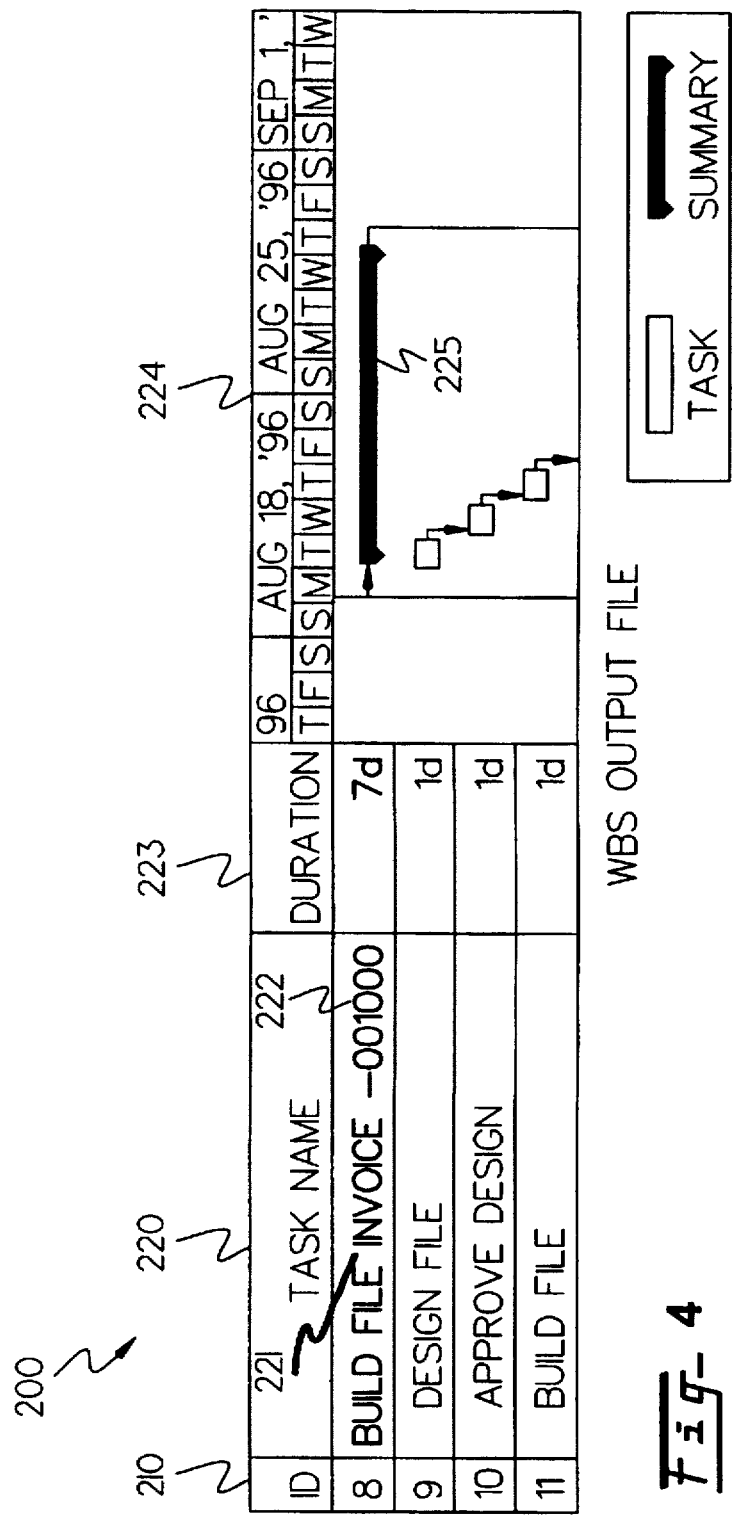
FIG. 4 shows an example of the file structure of a WBS Output File as it appears to a user.

FIG. 4 shows an example of the file structure of a WBS Output File 200 as it appears to the user. Column 210 of WBS Output File 200 contains a task identifier (ID). The task identifier is a unique numerical identifier assigned to each task in the WBS Output File. Column 220 contains the summary task name 226, i.e., the task name, such as BUILD FILE, as it appears in the WBS template file; the function point component prefix 221, e.g. INVOICE, as it appears in the function point component file; and the function point component suffix 222, as it appears in the function point component file. Column 220 also contains the name of the subtasks associated with the summary task, e.g. Design File, Approve Design, Build File, etc.

Column 223 of WBS Output File 200 contains an indication of the duration of each summary task and sub-task. For example an entry of 7d in column 223 indicates a task duration of 7 days. WBS Output File 200 also contains a graphical illustration of the predecessor and successor task relationship of each task in column 220 and may presented along with an indication of the month, year and day in which the tasks are scheduled. In the preferred embodiment summary tasks are indicated in column 224 by a heavy solid line 225 indicating duration of the summary task over months and days. Boxes in column 224 indicate tasks and arrows indicate the sequence in which the tasks are to be performed. Predecessor and successor relationship of tasks may be presented in alternate formats such as numerical or alphabetical. These alternate formats remain within the scope of the present invention.

Figure 5:
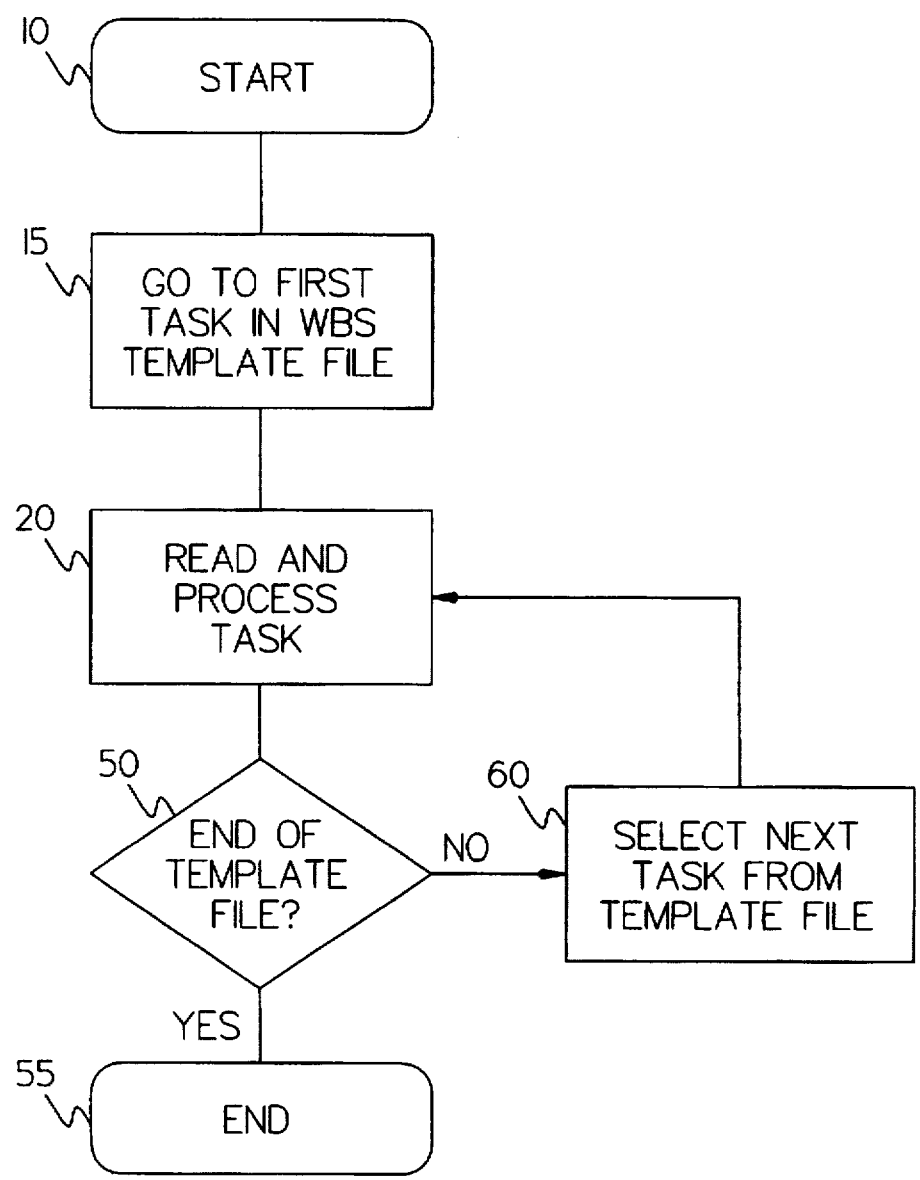
FIG. 5 is a high level flow chart of the sequence of operations for the processing means of the present invention.

FIG. 5 is a high level flow chart illustrating the sequence of operations by which processing means 23 creates the WBS Output File described above. Appendix A, attached hereto, includes a high level step by step description of the computer program which controls the sequence of operations for processing means 23. Appendix B includes a detailed code listing of the computer program which controls the sequence of operations for processing means 23. The program instructions are stored in the WBS program file which resides in means for storing program files 50.

The sequence is initiated by the user via user input to an application level program such as Productivity Manager™. This application level program then passes control of processing means 23 to the WBS Program. Once the process is initiated the process runs without user interaction.

After initiation step 10, the WBS template file is opened, if not already opened, and the system is prepared to read the task information in the WBS template file in sequential order, step 15. Next, the task information is read and processed, step 20. The detailed steps comprising step 20 for reading and processing tasks are shown in FIG. 6, and discussed hereinafter.

After the task is read and processed as in step 20, it is determined whether the task is the last task in the WBS Template File, step 50. If the answer is yes, the process terminates and control is returned to the application level program which called the WBS program, step 55. If the answer is no, the next task is selected from the WBS Template File, step 60. After the next task is selected in step 60, steps 20 and 50 are repeated until the last task has been read and processed.

FIG. 6 is a detailed flow chart of Read and Process step 20, in the sequence depicted in FIG. 5. Appendix B includes a code listing of the computer program which controls the read and process step.

First, the first task is read from the WBS template file, step 22. Next it is determined whether the task is static, step 24. If the answer is no, the next step is 25, to build a list of function point components which have the same function point component type and action as the task read from the WBS template file in step 22. These are the function point components associated with the task, i.e., associated function point components. Step 26 reads the first unique function point component identification number from the list of function point components built in step 25.

Next, the task information read in step 22 is combined with the function point component information from the first function point component in the associated function point component list, step 30. Execution of step 30 also results in converting the format of the combined information to the format of the WBS Output File. The format of the WBS Output File should be chosen to be compatible with the application software used to build the WBS Template File. Appendix C contains a computer program listing of the steps required to convert a file in Microsoft Project® format to the format of the WBS Output File. In the preferred embodiment the format of the WBS Output File is compatible with the Productivity Manager™ application software package.

Returning to step 24, if the task is static and thus the answer is yes, no associated function point component is built for that task and step 30 is executed next.

After the task information is converted to the proper format it is written to the WBS output file, step 32. Next, it is determined whether the successor list for this task is complete. It is not permissible to write the successor list for the task read in step 22 to the WBS Output File until the successor list is complete. If the successor list is complete, the successor list is written to the WBS Output File, step 36. Then, step 37—build the predecessor list for the task, is performed. If the answer is no, the successor list is not written to the WBS Output File. Instead step 37 is performed—build the predecessor list for the task.

The next step, 38, is to determine whether it is permissible to write the predecessor list to the WBS Output File. As with the successor list, it is not permissible to write the predecessor list to the WBS Output File until the predecessor list is complete. If the predecessor list is complete, the predecessor list is written to the WBS Output File, step 39. If the predecessor list is not complete then step 40 is performed after step 38.

Step 40 determines whether the task is a summary task. A summary task is one which comprises and summarizes lower level tasks, i.e., sub tasks. If the task is a summary task, then steps 22 through 40 are repeated until a non summary task, or sub task, is read. When steps 22 through 39 have been performed for a sub task, execution of step 40 will result in a "no" answer. In that case, the next step 41 is to determine if the task is static. If the task is static, i.e., performed only once during the lifetime of the project then the process of step 20 ends and control reverts to the main WBS program.

If the task is not static, i.e., it occurs more than once during the lifetime of the project, then execution of step 42 determines if there are any more function point components in the function point component list associated with this task. If there are no more function point components associated with the task, the step 20 ends and control reverts to the main WBS program.

If there are more function point components in the function point component list associated with this task then the next function point component identification is obtained, step 43. Then steps 30 through 42 are repeated until there are no more function point components in the function point component list associated with this task. At that point step 20 ends and control reverts to the main WBS program.

Figure 6B:
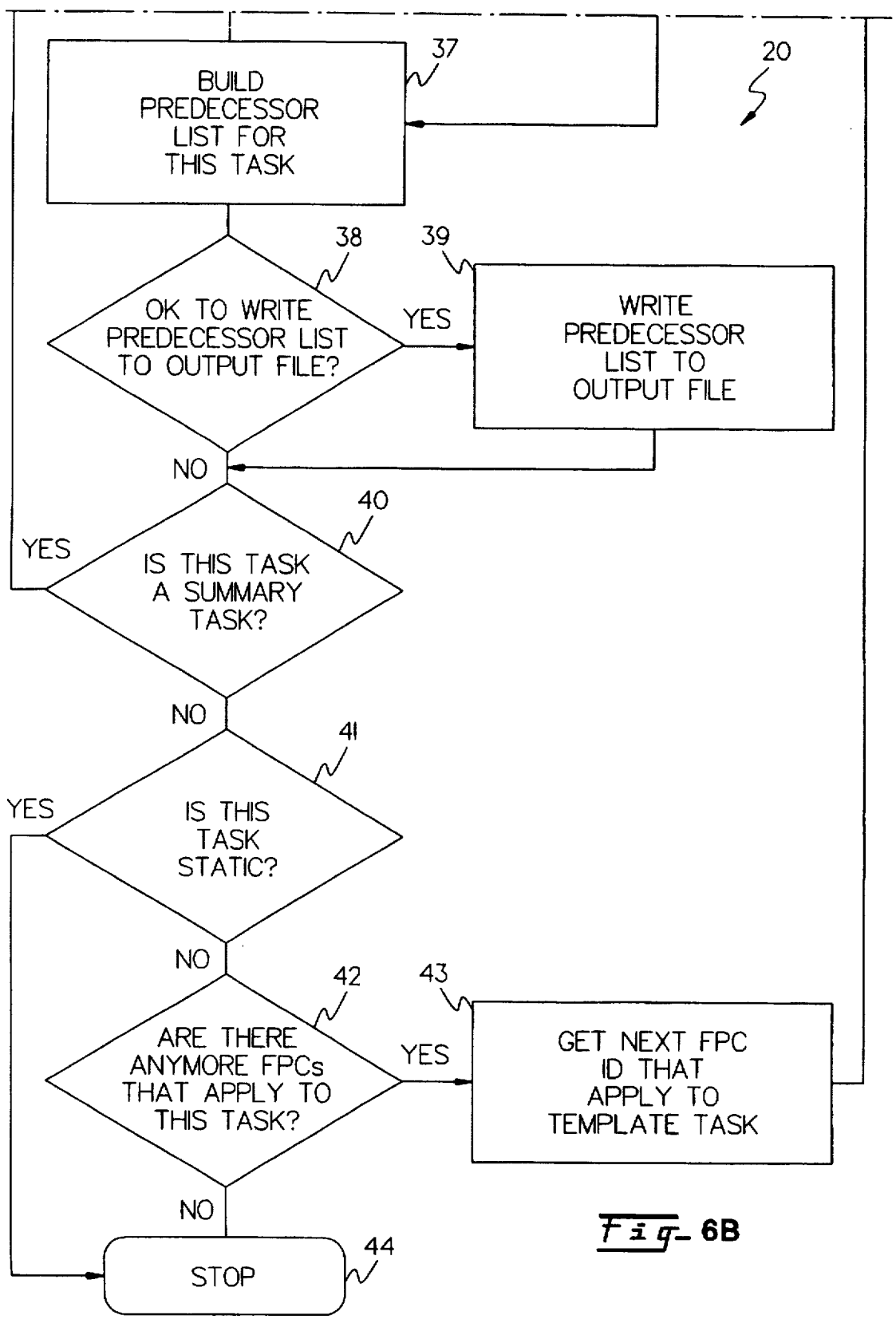

For purposes of this specification the process of creating a task in the WBS Output File for each function point component associated with a task in the WBS Template File is referred to as exploding and is represented by steps 25–44 of FIG. 6A and 6B.

While the invention has been described in conjunction with various embodiments, they are illustrative only. Accordingly, many alternatives, modifications and variations will be apparent to persons skilled in the art in light of the foregoing detailed description. The foregoing description is intended to embrace all such alternatives and variations falling within the spirit and broad scope of the appended claims.

APPENDIX A
PSEUDO CODE
WBS MAIN PROGRAM

INPUTS
Plan Template File -> Tasks Contained within this file are referred to as OLD Tasks
Component File -> List of all FP Components identified by the user OUTPUTS
WBS File -> Tasks Contained within this file are referred to as NEW Tasks DATA CONSTRUCTS
Component List -> List of all components that apply to the currently selected OLD Task
Successor Table ->

| Old Task ID | List of Successors Tasks |
|---|---|
|  |  |

Predecessor Table ->

| Old Task ID | List of Predecessor Tasks |
|---|---|
|  |  |

DEFINITIONS

Static Task -> Task occurs only once and does not interact with any function point components
Summary Task -> Task that has sub tasks
Sub Tasks -> Tasks that define in greater detail work to be performed
Subordinate Tasks -> See Sub Tasks

MAIN
Go To First Task In Template File
While Not All Talks Have Been Processed
  [Process Task]
End While PROCESS TASK
Read The Old Task Information From Template File
Build List Of Components From The Input Component File That Apply To The Old Task
For Each Component That Applies To The Old Task Or If Task Is Static
  [Prepare New Task Using Component ID]
  [Write New Task]
  [Build Successor List]
  [Write Task Predecessor List]
  [Build Predecessor List]
  [Write Task Successor List]
  If Old Task Is A Summary Task Or The Next Old Task Is Subordinate To The Current Old Task
    Recursive Call To Process Any Subordinate Tasks
  End IF
  IF The Task Is Static
    Return To The Calling Routine
  ENDIF
End For STEP 1 - Prepare New Task Using Component ID Copy The Task Information To The Output WBS File
Read The Component ID To Merge Into The Output Task Information
Merge Component ID Into Output Task Name
Create New Task ID Number For Output Task
Erase New Task Successor List For Output Task
Erase New Task Predecessor List For Output Task STEP 2 - Write New Task
  Write The Output Task Information To Output WBS File STEP 3 - Build Successor List
  For Each Successor Task Number In The Old Task Successor List ( Read From Template File)
    IF Old Successor Task Number > Old Task Number For Current Task
      Look In The Index Column Of The Successor Table For The Old Task Number
      IF Found
        Append The New Task Number To The List Of Task Successors For The Old Task
      Else
        Make A New Row In The Successor Table
        Place The Old Task ID Number In The Index Column Of The New Row
        Place The New Task ID Number In The List Of Successor Tasks Column Of The New Row
      End IF
    End IF
  End For STEP 4 - Write Task Predecessor List
  Look In The Index Column Of The Successor Table For The Old Task Number
  If Found
    Write The Old Tasks Successor List To The Predecessor Field Of The New Task In The Output File
    Erase The Old Task Row From The Successor Table
  End IF STEP 5 - Build Predecessor List
  For Each Predecessor Task Number In The Old Task Predecessor List (Read From Template File)
    IF Old Predecessor Task Number > Old Task Number For Current Task
      Look In The Index Column Of The Predecessor Table For The Old Task Number
      IF Found
        Append The New Task Number To The List Of Predecessor Tasks For The Old Tasks
      Else
        Make A New Row In The Predecessor Table
        Place The Old Task ID Number In The Index Column Of The New Row
        Place The New Task ID Number In The Predecessor List Column Of The New Row
      End IF
    End IF
  End For STEP 6 - Write Task Successor List
  Look In The Index Column Of The Predecessor Table For The Old Task Number
  IF Found
    Write The Old Tasks Predecessor List To The Successor Field Of The New Task In The Output File
    Erase The Old Task Row From The Predecessor Table
  End IF

APPENDIX B
WBS MAIN PROGRAM

```
PARAMETERS OldDbf,NewDbf

_Refox_ = (9876543210)
_Refox_ = (9876543210)

* DEVELOPMENT VARS
*  IF '3.0' $ Version()
*    Wait Window "Detected Visual Fox Running" Timeout 2
*    Set path to D:\fpw26;G:;H:
*  Else
*    Set Path to F:\develop\work\design;D:\fpw26;F:\Develop\Work\Design\Dbfs
*  EndIF
*    OldDBF = 'WhiteBrd.DBF'
*    NewDBF = 'Output.DBF'
* K_ProjID = 'DVLPMNT'
* K_ApplID = 'SAMPLE'
* k_ProjLevel = '0'
* End DevelopVars SET TALK OFF
OverwriteOutput = .T.
IDMarker = '<F>'

IF !OpenFiles()
    RETURN
ENDIF

PUBLIC Pred,Succ
DECLARE Pred[1]
DECLARE Succ[1]
PUBLIC SuccIndex,PredIndex
DECLARE SuccIndex[1,2]
DECLARE PredIndex[1,2]
SuccIndex[1,1] = 0
PredIndex[1,1] = 0
PUBLIC nAEICount,nAEOCount,nAEQCount,nAILFCount,nAEIFCount
PUBLIC nCEICount,nCEOCount,nCEQCount,nCILFCount,nCEIFCount
PUBLIC nDEICount,nDEOCount,nDEQCount,nDILFCount,nDEIFCount
PUBLIC nBEICount,nBEOCount,nBEQCount,nBILFCount,nBEIFCount
STORE 0 TO nAEICount,nAEOCount,nAEQCount,nAILFCount,nAEIFCount
STORE 0 TO nCEICount,nCEOCount,nCEQCount,nCILFCount,nCEIFCount
STORE 0 TO nDEICount,nDEOCount,nDEQCount,nDILFCount,nDEIFCount
STORE 0 TO nBEICount,nBEOCount,nBEQCount,nBILFCount,nBEIFCount
nIDCnt = 0
DO GetCompCount WITH 'A' && Count Compons with Add Actions
DO GetCompCount WITH 'C' && Count Compons with Change Actions
DO GetCompCount WITH 'D' && Count Compons with Delete Actions
DO GetCompCount WITH 'B' && Count Compons with Blank Actions
MsgText1 = "Merging Project Components into Plan "
Dot = CHR(139)
DotLimit = 18
MsgText2 = Dot SELECT Old
LOCATE FOR .T.
```

```
DO WHILE !EOF()
    =ProcessTask(0)
ENDDO
SET MESSAGE TO ' '
DO Cleanup
RETURN FUNCTION ProcessTask
PARAMETER p_nRecCntr, p_cComponentName
PRIVATE NumDots
NumDots = OCCURS(Dot,MsgText2)
IF NumDots > DotLimit
    NumDots = 0
ENDIF
MsgText2 = REPLICATE(Dot,NumDots+1)
SET MESSAGE TO MsgText1+MsgText2
PRIVATE l_cComponentName
PRIVATE nNumParams
nNumParams = PARAMETERS()
IF nNumParams >1
    l_cComponentName = p_cComponentName
ENDIF
PRIVATE nWhatLevel
nWhatLevel = p_nRecCntr + 1
PRIVATE nNumIter
PRIVATE NextTaskIsSubord
NextTaskIsSubord = .F.
PRIVATE ReturnToTaskRecNo
ReturnToTaskRecNo = RECNO()
nNumIter = 0
PRIVATE nNumCompons
nNumCompons = CalcNumCompons()

IF nNumCompons = 0
    nThisOutLn_Lvl = Old.OutLn_Lvl
    IF !EOF()
        SKIP
    ENDIF
    DO While Old.OutLn_Lvl > nThisOutLn_Lvl AND !EOF()
        IF !EOF()
            SKIP
        ENDIF
    ENDDO
    RETURN
ENDIF DO WHILE  nNumIter < nNumCompons
    GOTO ReturnToTaskRecNo
    nNumIter = nNumIter+1
    IF Old.Dynamic = 'Yes'              && If The Task Is Dynamic
        DO GetCompList                  &&   Select the component Subset to work on
    ELSE
        IF USED('CompSubSet')
            USE IN Compsubset
        ENDIF
    ENDIF
```

```
    IF nNumParams = 1 AND USED('CompSubSet')              &&    If the comp_id wasn't passed and the
task is dynamic and we found
components
        GOTO nNumIter IN CompSubSet
        l_cComponentName = CompSubSet.Comp_ID
    ENDIF
    SCATTER MEMVAR BLANK
    DO Step1                        && Move Record Pointer In Old & Convert Old Task to New Task
    DO Step2                        && Write Record To New
    IF !EMPTY(Old.ID)        && If the task record is empty( Not Defined in Project)
        DO Step3                        && Process Successors
        DO Step4                        && Add Predecessors to the current Task (if any exist)
        DO Step5            && Process Predeccessors
        DO Step6                        && Add Successors to Current Task (If Any Exist)
        SummaryTaskID = SubordToDynamicSummary()
        DO CASE
            CASE ALLTRIM(Old.Dynamic) = 'No' AND SummaryTaskID = -1
                DO KillSuccList
            CASE ALLTRIM(Old.Dynamic) = 'Yes' AND nNumIter = nNumCompons
                DO KillSuccList
            CASE SummaryTaskID <> -1
                DO ScrubSuccList WITH SummaryTaskID
        ENDCASE
        CurOutln_Lvl = Old.OutLn_Lvl
        CurRecNo = RECNO()
        IF GoNextTask()                         && Goto the next old task , ignoring blank recs
            NextTaskisSubord = Old.OutLn_Lvl > CurOutln_Lvl
        ENDIF
        GO CurRecNo
    ENDIF
    IF !EOF()
        SKIP
    ENDIF
*   IF !EOF() AND SubordToDynamicSummary()
*       EXIT
*   ENDIF SELECT Old
    IF new.Summary = 'Yes' OR NextTaskIsSubord
        DO WHILE Old.Outln_Lvl > nWhatLevel
            IF TYPE('l_cComponentName') <> 'U'
                =ProcessTask(nWhatLevel,l_cComponentName)
            ELSE
                =ProcessTask(nWhatLevel)
            ENDIF
        ENDDO
    ENDIF
ENDDO
RETURN PROCEDURE Step1
*****************************************************
* Move Pointer Record to Next Task in Old
*****************************************************
IF EOF()
    WAIT WINDOW "Hit End of File "+ALLTRIM(DBF())
```

```
        RETURN
    ENDIF
    ****************************************
    * Prepare Old Task Info In Ram
    ****************************************
    SCATTER MEMVAR                                              && Copy to Ram
    m.Preds = ''                                                && Wipe out the Old Predecessor
    Values
    m.Successors = ''                                           && Wipe out the old Successor Values
    nIDCnt = nIDCnt+1          && Increment the new task ID Counter
    IF !EMPTY(Old.ID)                                           && IF The Task Has Been Defined
        STORE nIDCnt TO m.Id,m.Unique_ID   &&   Make a New ID & Increment the New Task ID Counter
    ENDIF
    IF AT(IDMarker,m.Task_Name) <> 0                && If the Task Name Contains the ID Marker
        DO ReplaceIDMarker                          &&   Replace it with the Component ID
    ENDIF
    RETURN PROCEDURE Step2
    ********************************************************
    * Write Record To New
    ********************************************************
    INSERT INTO New FROM MEMVAR
    RETURN PROCEDURE Step3
    NumOfSucc = GetSuccessors(Old.Successors)      && Calculate # of Successors For This Task
    FOR SuccLoop = 1 TO NumOfSucc                                && Repeat This For Each
    Successor
    ********************************************************
    * Step 3) IF Successor Task ID > Old Task ID
    *       Look For Sucessor Task Num In Successor Index Array
    *       IF Successor Task Num Not Found in Successor Index Array
    *           Add A New Element to the successor Index Array
    *           Write the Successor Task Number and Successor List Array Name to new Element
    *           Create A New Successor List Array
    *       EndIF
    *       Update the Successor List Array with the New Task Number
    *   EndIF
    ********************************************************
        SuccTaskID = Succ[SuccLoop]                              && Assigned the
    Successor Task ID
        IF SuccTaskID > Old.ID                                   && IF Successor
    Task ID > Old Task ID
            FoundInRow = Aseek('SuccIndex',SuccTaskID,1)
            IF FoundInRow= 0                                     &&   IF Succ
    Task Num Not in Succ Index
                NewEleNum = ALEN(SuccIndex,1)+1        &&    Add New Ele To Succ Index
                DECLARE SuccIndex[NewEleNum,2]         &&    Add New Ele To Succ
    Index
                SuccIndex[NewEleNum,1] = SuccTaskID    &&    Write in the Successor ID to the Index
                SuccList ='S'+ALLTRIM(STR(NewEleNum,10,0)) &&  Create The Succ List Array Name
                SuccIndex[NewEleNum,2] = SuccList         &&    Write the Succ List Array Name to the
    index
                PUBLIC &SuccList                                  &&    Declare
    the Succ List Public
```

```
        NextSuccListEle = 1                              &&   Next Succ List
Element to fill in is 1
        ELSE
&&  Else (Succ Num Was Found in Succ Index)
        SuccList = SuccIndex[FoundInRow,2]       &&  Get the Succ List Array Name
        NextSuccListEle = ALEN(&SuccList)+1        &&  Next Succ List Element to fill is 1 greater
than next 1
    ENDIF
    DECLARE &SuccList[NextSuccListEle]                   && Make Room in the Succ List For 1
More element
    &SuccList[NextSuccListEle] = m.ID                    && Write The New Task ID to the Succ
List Array
  ENDIF
ENDFOR
RETURN PROCEDURE Step4
*****************************************************************
* Step 4) IF the Old Task ID is In the Sucessor Index Array
*       Copy the Sucessor List into the predecessor Field of the New Task
*       Release Successor List Array
*       Remove The Corresponding Row From The Successor Index Array
*       EndIF
*****************************************************************
    IndexRowNum = ASeek('SuccIndex',Old.ID,1)            && Find The Old Task ID In The
Successor Index
    IF IndexRowNum <> 0                                  && If old Task ID
is in the Successor Index Array
        SuccList = SuccIndex[IndexRowNum,2]              && Get the Array Name of the
Successor List
        m.Preds = BuildStr(SuccList)                     && Build The New Tasks
Predecessors From The Succ List
        REPLACE New.Preds WITH m.Preds                   && Write The New Tasks
Predecessors to the File
    *   Release &SuccList                                &&
Remove The Successor List For this Task
    *   SuccIndex[IndexRowNum,1]= 0                      && Remove The
Entry in the Successor Index For This Task (Succ Task ID)
    *   SuccIndex[IndexRowNum,2]= 0                      && Remove The Entry in the
Successor Index For This Task (Succ List Array name)
    ENDIF
RETURN PROCEDURE Step5
NumOfPreds = GetPreds(Old.Preds)                         && Calculate # of Predecessors
FOR PredLoop = 1 TO NumOfPreds                           && Repeat This For
Each Predecessor
********************************************************
    * Step 5) IF Predecessor Task ID > Old Task ID
    *     Look For Predecessor Task Num In Predecessor Index Array
    *     IF Predecessor Task Num Not Found in Predecessor Index Array
    *         Add A New Element to the Predecessor Index Array
    *         Write the Predecessor Task Number and Predecessor List Array Name to new Element
    *         Create A New Predecessor List Array
    *     EndIF
    *     Update the Predecessor List Array with the New Task Number
    *     EndIF
```

```
        PredTaskID = Pred[PredLoop]                              && Assign
Predecessor Task ID
        IF PredTaskID > Old.ID                                              && IF The Pred
Task ID > Old Task ID
            FoundInRow = ASeek('PredIndex',PredTaskID,1)
            IF  FoundInRow= 0                                              &&   IF Pred
Task ID Not Found in Pred Index
                NewEleNum = ALEN(PredIndex,1)+1            &&     Add An Entry to the Pred
Index
                DECLARE PredIndex[NewEleNum,2]                &&     Add An Entry To the
Pred Index
                PredIndex[NewEleNum,1] = PredTaskID        &&    Write the Pred Task ID to the Pred
Index
                PredList = 'P'+ALLTRIM(STR(NewEleNum,10,0)) &&      Create The Pred List Array Name
                PredIndex[NewEleNum,2] = PredList                   &&                 Write The Pred List
Array Name to the Pred Index
                PUBLIC &PredList                                           &&        Declare
the Pred List Public
                NextPredListEle = 1                                       &&       Next Available
Entry In Pred List = 1
            ELSE
&&    Else (Pred Task ID Was Found in Pred Index)
                PredList = PredIndex[FoundInRow,2]         &&    Get the name of the pred List Array
                NextPredListEle = ALEN(&PredList)+1                 &&     Next Available Entry in Pred List =
Append one
            ENDIF
            DECLARE &PredList[NextPredListEle]                      &&    Make a New Element in the
Pred List For this Task
            &PredList[NextPredListEle] = m.ID                         &&    Write the New Task Number
to the PRed List Array
        ENDIF
ENDFOR
RETURN PROCEDURE Step6
****************************************************************
* Step 6) IF Old Task ID is in Predecessor Index Array
*         Copy Predecessor List into Successor Field of New Task
*    EndIF
****************************************************************
IndexRowNum = ASeek('PredIndex',Old.ID,1)                    && Find The Old Task ID In The Predessor
Index
IF IndexRowNum <> 0                                                      && If old Task ID Is in
the Predecessor Index Array
    PredList = PredIndex[IndexRowNum,2]                      && Get the Array Name of the Predecessor
List
    m.Successors = BuildStr(PredList)                         && Build The New Tasks Successors From The
Pred List
    REPLACE New.Successors WITH m.Successors                         && Write The New Tasks
Sucessors to the New File
ENDIF
RETURN

*===========================================================================
===
* Utility Functions
```

```
*=============================================================================
===
******************************************************
* Function : GoNextTask                       *
* Purpose  : Moves The Rec Pointer in Old To The Next Task,   *
*            Ignoring Blank Records            *
******************************************************
FUNCTION GoNextTask
IF !EOF()
   SKIP 1
ENDIF
DO WHILE !EOF() AND EMPTY(Old.ID)
   SKIP 1
ENDDO
IF EOF()
   RETURN .F.
ENDIF
RETURN .T.

******************************************************
* Function : GoPrevTask                       *
* Purpose  : Moves The Rec Pointer in Old To The Prev Task,   *
*            Ignoring Blank Records            *
******************************************************
FUNCTION GoPrevTask
IF !BOF()
   SKIP -1
ENDIF
DO WHILE !BOF() AND EMPTY(Old.ID)
   SKIP -11
ENDDO
IF BOF()
   RETURN .F.
ENDIF
RETURN .T.

******************************************************
* Function : SubordToDyanmicSummary             *
* Purpose  : Returns Task ID of the Dynamic Summary If Current *
*            Task Is Subordinate to a Dynamic Summary Task    *
*     Else Returns -1                          *
******************************************************
FUNCTION SubordToDynamicSummary
PRIVATE RetVal,CurRecNo,CurOutLvl
DO CASE
CASE Old.Outln_Lvl = 1       && If task is a level 1 Task, it can't be subord to Dyanmic Summary
   RetVal = -1
CASE BOF()                              && If at Top of File, Can't be Subord To Dynamic Summary
   RetVal = -1
OTHERWISE
   CurRecNo = RECNO()
   CurOutLvl = Old.Outln_lvl
   DO WHILE !BOF() AND ((ALLTRIM(Old.Dynamic) = 'No' AND Old.Outln_lvl >= 1) OR CurRecNo = RECNO())
      DO WHILE !BOF() AND (Old.Outln_lvl >= CurOutLvl OR EMPTY(old.ID))
         SKIP -1
      ENDDO
      CurOutLvl = Old.Outln_lvl
```

```
      ENDDO
      IF BOF()
          RetVal = -1
      ELSE
          RetVal = IIF(Old.Dynamic = 'Yes',Old.ID,-1)
      ENDIF
      GOTO CurRecNo
ENDCASE
RETURN RetVal
```

```
*******************************************************
* Function : BuildStr                                  *
* Purpose  : Returns a String Concatenated from the elements in *
*            array <Arrayname> and Delimited by Commas *
*******************************************************
FUNCTION BuildStr
PARAMETERS pArrayName
PRIVATE nArrayLen,nBuild,RetStr
nArrayLen = ALEN(&pArrayName)
RetStr = ''
FOR nBuild = 1 TO nArrayLen
    RetStr = RetStr+ALLTRIM(STR(&pArrayName[nBuild],10,0))
    IF nBuild <> nArrayLen
        RetStr = RetStr + ","
    ENDIF
ENDFOR
RETURN RetStr
```

```
*******************************************************
* Function : ASeek                                     *
* Purpose  : Searches Array <ArrayName> in Column <ColNum> For *
*            Expression <Target>. Returns The Row Number of the *
*            Found Expression, or 0 if Not found      *
*******************************************************
FUNCTION ASeek
PARAMETERS pArrayName,pTarget,pColNum
PRIVATE nCounter
nCounter = 1
DO WHILE nCounter <= ALEN(&pArrayName,1)
    IF &pArrayName[nCounter,pColNum] = pTarget
        EXIT
    ENDIF
    nCounter = nCounter + 1
ENDDO
IF nCounter > ALEN(&pArrayName,1)
    nCounter = 0
ENDIF
RETURN nCounter
```

```
*******************************************************
* Function : GetCompList                               *
*
* Purpose  : Selects the Compons that apply to the current task *
*******************************************************
PROCEDURE GetCompList
PRIVATE EiClause,EoClause,EQClause,ILFClause,EIFClause,TypeClause
PRIVATE AddClause,ChangeClause,DeleteClause,ActionClause
```

```
PRIVATE WhereClause,FileName,OldExact

AddClause    = IIF(Old.Add    = 'Yes',"ADD",'')
ChangeClause = IIF(Old.Change = 'Yes',"CHANGE",'')
DeleteClause = IIF(Old.Delete = 'Yes',"DELETE",'')

ActionClause = ALLTRIM(AddClause + IIF(!EMPTY(AddClause),',','') + ;
    ChangeClause + IIF(!EMPTY(ChangeClause),',','') + ;
    DeleteClause)

IF RIGHT(ActionClause,1) = ','
    ActionClause = LEFT(ActionClause,LEN(ActionClause)-1)
ENDIF EIClause  = IIF(Old.EI  = 'Yes', "'EI'" ,'')
EOClause  = IIF(Old.EO  = 'Yes', "'EO'" ,'')
EQClause  = IIF(Old.EQ  = 'Yes', "'EQ'" ,'')
ILFClause = IIF(Old.ILF = 'Yes', "'ILF'",'')
EIFClause = IIF(Old.EIF = 'Yes', "'EIF'",'')

TypeClause = ALLTRIM(EIClause + IIF(!EMPTY(EIClause),',','') + ;
    EOClause + IIF(!EMPTY(EOClause),',','') + ;
    EQClause + IIF(!EMPTY(EQClause),',','') + ;
    ILFClause + IIF(!EMPTY(ILFClause),',','') + ;
    EIFClause)

IF RIGHT(TypeClause,1) = ','
    TypeClause = LEFT(TypeClause,LEN(TypeClause)-1)
ENDIF TypeClause = IIF(EMPTY(TypeClause),"''",TypeClause)
ActionClause = IIF(EMPTY(ActionClause),"''",ActionClause)

OldExact = Set('Exact')
Set Exact On
Set Ansi On

WhereClause = 'Type in ('+TypeClause+') And Action in ('+ActionCLause+')'
SELECT Comp_ID,TYPE,Action;
    FROM ProjComp ;
    WHERE &WhereClause;
    INTO CURSOR CompSubSet Set Exact &OldExact
Set Ansi &OldExact SELECT Old
RETURN

*****************************************************************
* Function : ReplaceIDMarker
* Purpose  : Replaces the ID Marker Field in the Task Name with *
*            the Component ID if the task is Dynamic. If the   *
*            Task is Static, Replaces Marker Field with Spaces *
```

```
******************************************************
FUNCTION ReplaceIDMarker
m.Task_Name = STRTRAN(m.Task_Name,IDMarker,IIF(Old.Dynamic = 'Yes',l_cComponentName,' '))
RETURN

******************************************************
* Function : GetSucessors
* Purpose  : Parses the Succecessor String <SuccStr> and returns*
*            an array of Succecessors                  *
******************************************************
FUNCTION GetSuccessors
PARAMETERS SuccStr
PRIVATE SuccCnt,StartPos,StopPos
SuccStr = ALLTRIM(SuccStr)
SuccCnt = OCCURS(',',SuccStr) + 1
IF SuccCnt = 1 AND EMPTY(SuccStr)
    SuccCnt = 0
ELSE
    DECLARE Succ[SuccCnt]
ENDIF
StartPos = 1
FOR BUILD = 1 TO SuccCnt
    StopPos = AT(',',SuccStr,BUILD)
    IF StopPos = 0
        StopPos = LEN(SuccStr)+1
    ENDIF
    Succ[Build] = VAL(SUBSTR(SuccStr,StartPos,StopPos-StartPos))
    StartPos = StopPos + 1
ENDFOR
RETURN SuccCnt

******************************************************
* Function : GetPreds
* Purpose  : Parses the Predecessor String <PredStr> and returns*
*            an array of Predecessors                  *
******************************************************
FUNCTION GetPreds
PARAMETERS PredStr
PRIVATE PredCnt,StartPos,StopPos
PredStr = ALLTRIM(PredStr)
PredCnt = OCCURS(',',PredStr) + 1
IF PredCnt = 1 AND EMPTY(PredStr)
    PredCnt = 0
ELSE
    DECLARE Pred[PredCnt]
ENDIF
StartPos = 1
FOR BUILD = 1 TO PredCnt
    StopPos = AT(',',PredStr,BUILD)
    IF StopPos = 0
        StopPos = LEN(PredStr)+1
    ENDIF
    Pred[Build] = VAL(SUBSTR(PredStr,StartPos,StopPos-StartPos))
    StartPos = StopPos + 1
ENDFOR
RETURN PredCnt
```

```
*****************************************************************
* Function : OpenFiles                            *
* Purpose  : Opens The Files Need By This Program     *
*****************************************************************
PROCEDURE OpenFiles
SET MESSAGE TO 'Opening Files...'
IF USED('New')
    USE IN New
ENDIF
IF USED(NewDBF)
    AliasName = ALIAS(NewDBF)
    USE IN (AliasName)
ENDIF
IF FILE(NewDBF) AND !OverwriteOutput
*       OkToCont=MsgBox(Chr(13)+'File '+Alltrim(NewDBF)+' Already Exists, Overwrite It?','Confirm
Overwrite','Question',4)=6
    OkToCont =OurMsgBox(CHR(13)+'File '+ALLTRIM(NewDBF)+' Already Exists, Overwrite It?','Confirm
Overwrite','Question',4) = 1
    IF !OkToCont
        RETURN .F.
    ENDIF
ENDIF
SELECT Old
OldSafe = SET('Safety')
SET SAFETY OFF
COPY STRUCTURE TO (NewDBF)
SET SAFE &OldSafe
USE (NewDbf) IN 0 ALIAS New
* Use (CompFile) in 0 Alias CompFile
* Select CompFile
* Set Filter to AllTrim(Appl_ID) = Alltrim(K_ApplID) and Alltrim(Proj_ID) = Alltrim(k_ProjID) and Alltrim(Proj_Level) =
Alltrim(K_Projlevel)
SELECT Old
SET MESSAGE TO "
RETURN

*****************************************************************
* Function : GetCompCount                          *
* Purpose  : Counts the Quantity of Each Type of Component   *
* Parameters: <pAction> One Letter Abbrev For Component Action   *
*        (ie A = Add, C= Change, D=Delete, B=Blank(No Action))  *
*****************************************************************
PROCEDURE GetCompCount
PARAMETERS pAction
PRIVATE tAction
tAction = IIF(pAction = 'B',' ',pAction)
SELECT TYPE,COUNT(TYPE)AS CNT ;
    FROM ProjComp ;
    WHERE LEFT(Action,1) == UPPER(TAction) ;
    GROUP BY TYPE ;
    INTO CURSOR FileCount
SELECT FileCount
LOCATE FOR .T.
SCAN
    VarName = 'n'+pAction+ALLTRIM(TYPE)+'Count'
    &VarName = FileCount.Cnt
ENDSCAN
```

```
USE IN FileCount
SELECT Old
RETURN

***************************************************************
* Function : CalcNumCompons                                    *
* Purpose  : Returns the Num of Comps Applicable to Each Task  *
***************************************************************
FUNCTION CalcNumCompons
PRIVATE RetCnt
IF Old.Dynamic = 'Yes'
    AddCnt = IIF(Old.EI = 'Yes' AND Old.Add = 'Yes',nAEICount,0) + ;
        IIF(Old.EO = 'Yes' AND Old.Add = 'Yes',nAEOCount,0) + ;
        IIF(Old.EQ = 'Yes' AND Old.Add = 'Yes',nAEQCount,0) + ;
        IIF(Old.ILF= 'Yes' AND Old.Add = 'Yes',nAILFCount,0) + ;
        IIF(Old.EIF= 'Yes' AND Old.Add = 'Yes',nAEIFCount,0)
    ChangeCnt = IIF(Old.EI = 'Yes' AND Old.Change = 'Yes',nCEICount,0) + ;
        IIF(Old.EO = 'Yes' AND Old.Change = 'Yes',nCEOCount,0) + ;
        IIF(Old.EQ = 'Yes' AND Old.Change = 'Yes',nCEQCount,0) + ;
        IIF(Old.ILF= 'Yes' AND Old.Change = 'Yes',nCILFCount,0) + ;
        IIF(Old.EIF= 'Yes' AND Old.Change = 'Yes',nCEIFCount,0)
    DelCnt = IIF(Old.EI = 'Yes' AND Old.Delete = 'Yes',nDEICount,0) + ;
        IIF(Old.EO = 'Yes' AND Old.Delete = 'Yes',nDEOCount,0) + ;
        IIF(Old.EQ = 'Yes' AND Old.Delete = 'Yes',nDEQCount,0) + ;
        IIF(Old.ILF= 'Yes' AND Old.Delete = 'Yes',nDILFCount,0) + ;
        IIF(Old.EIF= 'Yes' AND Old.Delete = 'Yes',nDEIFCount,0)
    BlankCnt = IIF(Old.EI  = 'Yes' AND Old.Add = 'No' AND Old.Change = 'No' AND Old.Delete = 'No',nBEICount,0) +

IIF(Old.EO  = 'Yes' AND Old.Add = 'No' AND Old.Change = 'No' AND Old.Delete = 'No',nBEOCount,0) + ;
        IIF(Old.EQ  = 'Yes' AND Old.Add = 'No' AND Old.Change = 'No' AND Old.Delete = 'No',nBEQCount,0) + ;
        IIF(Old.ILF = 'Yes' AND Old.Add = 'No' AND Old.Change = 'No' AND Old.Delete = 'No',nBILFCount,0) + ;
        IIF(Old.EIF = 'Yes' AND Old.Add = 'No' AND Old.Change = 'No' AND Old.Delete = 'No',nBEIFCount,0)
    RetCnt = AddCnt+ChangeCnt+DelCnt+BlankCnt
ELSE
    RetCnt = 1
ENDIF
RETURN RetCnt

***************************************************************
* Function : CleanUp                                           *
* Purpose  : Clears the Arrays and Closes The Data Each Task   *
***************************************************************
PROCEDURE Cleanup
RELEASE ALL
* Close Data
RETURN

*================================================================================
* SCRAP PROCEDURES - NO LONGER USED
*================================================================================

FUNCTION XSubordinateToDynamicSummary
PRIVATE CurRecNo,CurOutLvl
```

```
CurRecNo = RECNO()  && Remember The Current Record Position
CurOutLvl = Old.Outln_Lvl
DO WHILE !BOF() AND !EMPTY(Old.Outln_Lvl) AND Old.OutLn_lvl >= CurOutLvl
    SKIP -1
ENDDO
IF BOF()
    LOCATE FOR .T.
ENDIF
RetVal = Old.Summary = 'Yes' AND Old.Dynamic = 'Yes'
GOTO CurRecNo  && Return to the current Task Record
RETURN RetVal FUNCTION AErase
* Removes Row <RowNum> From Array <ArrayName>
PARAMETERS ArrayName,RowNum
PRIVATE ArraySize
ArraySize = ALEN(&ArrayName,1)
IF ArraySize = 1
    DECLARE &ArrayName[1,2]
    &ArrayName[1,1] = ''
    &ArrayName[1,2] = ''
ELSE
    PRIVATE TempHold
    DECLARE TempHold(ArraySize -1,2)
    TmpCnt = 0
    FOR X = 1 TO ArraySize
        IF X <> RowNum
            TempCnt = TempCnt + 1
            TempHold[TempCnt,1] = &ArrayName[X,1]
            TempHold[TempCnt,1] = &ArrayName[X,1]
        ENDIF
    ENDFOR
    DECLARE &ArrayName[ArraySize-1,2]
    =ACOPY(TempHold,&ArrayName)
ENDIF
RETURN

***********************************************************
* Function : NewID
*
* Purpose  : Returns a New Task ID Based on <pCnt>         *
***********************************************************
FUNCTION NewID
PARAMETERS pCnt
RETURN pCnt+1

***********************************************************
* Function : KillSuccList
*
* Purpose  : Releases the array for the succesor list      *
***********************************************************
FUNCTION KillSuccList PRIVATE IndexRowNum,SuccList IndexRowNum = ASeek('SuccIndex',Old.ID,1)
```

```
IF IndexRowNum <> 0                                              && If old Task ID is in
the Successor Index Array
    SuccList = SuccIndex[IndexRowNum,2]        && Get the Array Name of the Successor List
    IndexRowNum = ASeek('SuccIndex',Old.ID,1)  && Find The Old Task ID In The Successor Index
    RELEASE &SuccList                                             && Remove The
Successor List For this Task
    SuccIndex[IndexRowNum,1]= 0                                   && Remove The Entry in the
Successor Index For This Task (Succ Task ID)
    SuccIndex[IndexRowNum,2]= 0                && Remove The Entry in the Successor Index For This Task
(Succ List Array name)
ENDIF

*****************************************************************
* Function : ScrubSuccList
*
* Purpose  : Removes succesors with ID's > p_SummaryID
*          : Releases the array if empty successor list       *
*****************************************************************
FUNCTION ScrubSuccList
PARAMETER p_SummaryID PRIVATE IndexRowNum,SuccList IndexRowNum = ASeek('SuccIndex',Old.ID,1)
IF IndexRowNum <> 0                                              && If old Task ID is in
the Successor Index Array
    SuccList = SuccIndex[IndexRowNum,2]        && Get the Array Name of the Successor List
    IndexRowNum = ASeek('SuccIndex',Old.ID,1)  && Find The Old Task ID In The Successor Index
    =ASORT(&SuccList)
    i = 1
    DO WHILE i <= ALEN(&SuccList)
       IF &succlist[i] > p_summaryID
         IF i = 1
           EXIT
         ENDIF
         =ADEL(&SuccList,i)
         DIMENSION &SuccList[ALEN(&SuccList) - 1]
       ELSE
         i=i+1
       ENDIF
    ENDDo
    IF &succlist[1] > p_summaryID
       RELEASE &SuccList                       && Remove The Successor List For this Task
       SuccIndex[IndexRowNum,1]= 0             && Remove The Entry in the Successor Index For This Task
(Succ Task ID)
       SuccIndex[IndexRowNum,2]= 0             && Remove The Entry in the Successor Index For This Task
(Succ List Array name)
    ENDIF
ENDIF

RETURN
```

APPENDIX C
FILE FORMAT CONVERSION PROGRAM
M-S PROJECT® TO WBS OUTPUT FILE

| Planwiz.prg | Page 1 |

```
****************************************************************************

****************************************************************************
_Refox_ = (9876543210)
_Refox_ = (9876543210)

DevelopMode = 'OFF'

IF DevelopMode = 'ON'
   * Develop Vars
   Set Path to F:\Develop\Test\Ver3.6\TSTData\DBFS;F:\Develop\Test\Ver3.6
   k_ProjID = 'PROJTEST '
         K_APPLID = 'SAMPLE  '
   K_ProjLevel = '0'
*  On Key Label F11 Cancel
*  On Key Label F12 Suspend
   ON ERROR
   m.ShowBit = .t.
* End Develop Vars
EndIF Private OkToContinue
IF DevelopMode = 'ON'
  OkToContinue = .t.
Else
  OkToContinue = .f.
  Do SetupMsProject with OkToContinue
EndIF
IF !OkToContinue
  Return .f.
EndIF Set Message to 'Productivity Manager Project Planning Wizard'

* Initialize the DDE Variables
  DDETimeout = 45                         && Num of Seconds to Wait For before a DDE
Command Timesout
  DDEContinue = .f.     && Permission Flag that must be set before the next DDE COmmand Can
Execute
  DDEErrorFree = .T.    && Is This DDE Session Error Free?
  UnableMsg = 'Unable To '
  AssistMsg = 'Project May Need Your Assistance. '
  SwitchMsg = 'Please Switch To MS Project At This Time. '
  NotRunMsg = 'Microsoft Project Is No Longer Running. '
```

| Planwiz.prg | Page 2 |

```
TitleMsg = 'Project Communications Error'
FileClose = 'Close The Project File. '
ExitProj = 'Exit Microsoft Project. '
AppMax = 'Maximize The MS Project Window. '
AppActive = 'Bring Project To The Foreground. '
FileOpen = 'Open The Specified Project. '
DBFSave = 'Save Project File To A DBF Structure. '
FileNew = 'Create A New Project File. '
OpenCSV = 'Open The Specified File (CSV Format). '
FileSave = 'Save The Project File. '
TemplateOpen = 'Please Close the Plan Builder File Before Continuing.'

* Set up The Tab Screen Variables
    LastPage = 3                                && Num of pages in the screen set
    Declare PageDesc[LastPage]      && Text to appear in the Wizard Desc Block
    PageDesc[1] = "Select the Project Plan Template To Implement. Plan Templates must have been built
through the Productivity Manager's Plan Builder"
    PageDesc[2] = "Select the Project in Productivity Manager to merge with the project template"
    PageDesc[3] = "Press Finish To Merge the selected project template with the Project's Function Point
Components"
    Declare PageName[LastPage]          && Page Names to appear in step List
    PageName[1] = 'Step 1 - Select Template'
    PageName[2] = 'Step 2 - Select Project'
    PageName[3] = 'Step 3 - Finish'
    Public TabStpBut                            && Holds The Value of the Active Page Number
    TabStpBut = 1

* Initialize the Default Values For The Wizard
    AfterSave = 1                               && After Saving, Return To PM
    GoodProj = .f.                              && Selected Project is Ok to use For Wizard
    FirstTime = .t.             && First Time Through Flag
    knShowPage = 1                              && Which Page to Show On Top
    =Acopy(PageName,StepArray)  && Load the Step Array From The Page names
    kcDesc1 = PageDesc[KnShowPage]  && Load up the Initial Description Block

* Tokenize the Action Buttons
    Cancel = 1
    Back = 2
    Next = 3
    Finish = 4

* Setup The Data Used By The Wizard
IF !Used('ProjHead')
    Use Projhead  in 0 Shared
EndIF && Only Level 0 - Non Summary Projects are eligble for merging with the wizard
Select Appl_ID, Proj_ID, Proj_Name ;
 From Projhead ;
 Where Proj_Level = '0' ;
  And Summary = .f.;
  Order By 1,2 ;
```

37

| Planwiz.prg | Page 3 |

```
    Into Cursor ProjList

IF RecCount('ProjList') = 0
     =Msg(299) &&No Eligble Projects Were Found in Producitivity Manager. A Non-Summary project
  must be added before continuing','No Projects Found','Exclamation',1)
     Return
  EndIF

* Initializae the Default Selected Project
  IF K_ProjLevel = '0'    && Check to See if the Currently Selected Project is eligble to use in the wizard
        Select ProjList
        Locate For Alltrim(ProjList.Appl_ID) = Alltrim(k_ApplID) and Alltrim(ProjList.Proj_ID) =
  Alltrim(k_ProjID)
             GoodProj = Found()    && IF The Project is eligble, Use it as the default selected project
  EndIF IF !GoodProj      && IF you need to select a different Project
     Select ProjList          && Take the first one off the Eligble Project List
     Locate For .t.
  EndIF
  SelProj = ProjList.Appl_ID + Space(3)+ProjList.Proj_ID+Space(3)+ProjList.Proj_Name =Close('Old')                          && Close The Data File If its open
  =Kill('ProjComp')                      && Close and Delete The File if its Open
  =Close('Struct')                       && Close the Temp File if its open
  =Close('New')                          && Close the New File if its open
  = SetKeys('Global')
  do Planwiz.spr                                   && Call the Tabbed Screen Set
  Set Message to ' '
  Set Library To
  =Close('ProjList')
  =Kill('ProjComp')
  On Key Return Function W_StepList
Parameters PageNum
  RetVal = tabstpbut =PageNum
Return RetVal Function V_StepList
Parameters PageNum
  StepVar = "StepList"+Alltrim(Str(TabStpBut)) && Build The Step Variable Name
  CurrPage = TabStpBut                    && Set The Current Page Variable
  TabStpBut= &StepVar                     && Increment the Current Page Counter
  Do NextPage with CurrPage,TabStpBut && Goto the Next Page
Return Function W_Desc
Return f.

Function V_Desc
```

38

| Planwiz.prg | Page 4 |

```
Return

Function W_PlanFile
 Retval = tabstpbut = 1
 IF RetVal and FirstTime
    =W_Show()              && Show The Gets
 EndIF
 Return RetVal Function V_PlanFile
 IF !File(PlanFile)        && If the user entered a bad filename
    Do DisableSteps        && Prevent them from moving on
    IF !Empty(PlanFile)  && if its not empty
       ?? Chr(7)           && Warn The User
          Wait Window "Invalid File Name" Timeout 3
       EndIF
 Else                                   && File name is valid
    Do EnableSteps         && Allow them to move on
 EndIF
 Return Function W_CallPlanFile
Return TabStpBut = 1 and MDown()

Function V_CallPlanFile
 TmpFile = GetFile('MPP','Select Plan File')   && Pop the get file dialog
 IF !Empty(TmpFile)        && If The user selected a file
    PlanFile = TmpFile     && Test it for validity
    Show Get PlanFile
    =V_PlanFile()
 EndIF
 Return Function W_Btns
Parameters PageNum
Return TabStpBut = PageNum Function V_Btns
Parameters PageNum
 OldStpBut = TabStpBut
 BtnVar = 'Btns'+Alltrim(Str(TabStpBut))
 Do Case
    Case &BtnVar = Cancel
      Clear Read
    Case &BtnVar = Next
      TabStpBut = TabStpBut + 1
      =NextPage(OldStpBut,TabStpBut)
    Case &BtnVar = Back
      TabStpBut = TabStpBut - 1
      =NextPage(OldStpBut,TabStpBut)
    Case &BtnVar = Finish
      IF TabStpBut <> LastPage                && If you're not on the last page
```

| Planwiz.prg | Page 5 |

```
            TabStpBut= LastPage                    && Goto the last page
              =NextPage(OldStpBut,TabStpBut)
          Else                                     && Otherwise
              Do BuildPlan                         && Build The Plan
          EndIF
    EndCase
Return Function W_Activate
Parameters PageNum
Return Function W_Show
  IF FirstTime                                     && For the inital Load
         For X = 2 To LastPage
           WinName = 'Plan'+Alltrim(str(X))+'SC'  && Disabled the other steps in the list
              Hide Window (WinName)                && Hides the other windows
         EndFor
              Show Get Btns1,Back Disabled         && Disable the Back Button
              Show Get Btns3,Next Disabled         && Disable the next Button
              Do DisableSteps                                    && Disabled the
Step List
           FirstTime = .f.                         && throw the First Time
Through Flag
  EndIF
Return Function EnableSteps
   StepArray[2] =PageName[2]
   IF GoodProj
     StepArray[3] = PageName[3]
   EndIF
   VarName = 'StepList'+ Alltrim(Str(TabStpBut))
   Show Get &VarName
   VarName = 'Btns'+Alltrim(Str(TabStpBut))
   Show Get &VarName ,Next Enabled
   IF GoodProj
         Show Get &VarName ,Finish Enabled
       EndIF
Return Function DisableSteps
   For X = 2 to LastPage
     StepArray[X] = '\'+PageName[X]
   EndFor
   VarName = 'StepList'+ Alltrim(Str(TabStpBut))
   Show Get &VarName
   VarName = 'Btns'+ Alltrim(Str(TabStpBut))
   Show Get &VarName ,Next Disabled
   Show Get &VarName ,Finish DisAbled
Return Function NextPage
```

| Planwiz.prg | Page 6 |

```
Parameters CurrPage,NewPage

StepVar = 'StepList'+Alltrim(str(newPage))
  &StepVar = NewPage
  Show Get &StepVar DescVar = 'kcDesc'+alltriM(str(NewPage))
  &DescVar = PageDesc[NewPage]
  SHow Get &DescVar WinName = "Plan"+Alltrim(Str(CurrPage))+"SC"
  Hide Window (WinName)
  WinName = "Plan"+Alltrim(Str(NewPage))+"SC"
  Show Window (WinName) In PlanWiz
  BtnVar = 'Btns'+Alltrim(Str(NewPage))
  IF GoodProj
    Do GoodProj
  Else
    Do NotGoodProj
  EndIF
Return NewPage Function W_SelProj
  IF Empty(SelProj)
     GoodProj = .f.
     Do NotGoodProj
  EndIF
Return TabStpBut = 2

Function V_SelProj
   GoodProj = !Empty(SelProj)
   IF GoodProj
     GoodProj = GetCompons()
   EndIF
   IF GoodProj
     Do GoodProj
   Else
     Do NotGoodProj
   EndIF
Return Procedure NotGoodProj
   Show Get Btns1,Finish Disabled
   Show Get Btns2,Next   Disabled
   Show Get Btns2,Finish Disabled
   StepArray[3] = '\'+PageName[3]
   Show Get StepList1
   Show Get StepList2
Return Procedure GoodProj
   Show Get Btns1,Finish Enabled
   Show Get Btns2,Next   Enabled
```

41

| Planwiz.prg | Page 7 |

```
    Show Get Btns2,Finish Enabled
    StepArray[3] = PageName[3]
    Show Get StepList1
    Show Get StepList2
Return Function W_AfterSave
Return TabStpBut = LastPage Function V_AfterSave
Return Procedure BuildPlan
  Do While .t.
    SaveName = PutFile('Save Plan As','','MPP')
    IF !Empty(SaveName)
      Exit
    EndIF
    IF Empty(SaveName)
      Return
    EndIF
  EndDO
  If File(SaveName)
    Delete File (SaveName)
  EndIF
  IF !Used('ProjComp')                          && IF you havent run the query to return the
          IF !GetCompons()                      && Project components Belonging to
the Selected Project
            Return .f.
          EndIF
  EndIF                                         && Do it Now Wait Window "One Moment Please..." Nowait

*==============> Create The File Names <==================
  PlanFile = Alltrim(planFile)
  LastDot = Occurs('.',PlanFile)
  ExtStarts = AT('.',PlanFile,LastDot)
  IF ExtStarts = 0
    PlanDBF = PlanFile+'.DBF'
  Else
    PlanDBF = left(PlanFile,ExtStarts)+'DBF'
  EndIF
  LastDot = Occurs('.',SaveName)
  ExtStarts = At('.',SaveName,LastDot)
  IF ExtStarts = 0
    SaveDBF = SaveName+'.DBF'
  Else
    SaveDBF = left(SaveName,ExtStarts)+'DBF'
  EndIF
  IF File(SaveDBF)
    Delete File (SaveDBF)
  EndIF
```

42

| Planwiz.prg | Page 8 |

```
*=============================================================

ProjChan = 0                                && Channel Number of the DDE Conversation
with Project
    HadToStartProj = .f.                        && Initialize the JumpStart Flag IF !StartProject()                          && If Project Wouldnt Start
        Return .f.                              && Get Out of here
    EndIF =Mpp2DBF(PlanFile,PlanDBF)                  && Convert the Plan File to a DBF File
    IF DDEErrorFree and ValidateStructure(PlanDBF)    && IF the DBF Has the proper fields
        =RuleCheck()                            &&    Enforce the Rule Checking
            =Blowout(PlanDBF,SaveDBF)           &&    Merge The Components Into The
Template
        IF DDEErrorFree
            =DBF2MPP(SaveDBF,SaveName)  &&    Save The Merged DBF File as a Project File
        EndIF
    EndIF
        Wait Clear
        IF DDEErrorFree
            =msg(303) && Chr(13)+'The Merged Project Plan has Been Saved.','Planning Wizard
Complete','Info',1)
        IF AfterSave = 1                        && User Has Selected to Return to PM
            =DDEReset()
            ProjResult=DDEExecute(ProjChan,'FileClose Save:=0',"DDEDone")    && Close the Current
File In Project
            =DDEWait(ProjResult,FileClose)
            IF HadToStartProj                                                && IF We Started
Project
                =DDEReset()
                ProjResult=DDEExecute(ProjChan,'Quit SaveChanges:=0',"DDEDone")    && Lets Shut it down
                =DDEWait(ProjResult,ExitProj)
            EndIF
        Else
            =DDEReset()
            ProjResult=DDEExecute(ProjChan,'AppMaximize',"DDEDone")
            =DDEWait(ProjResult,AppMax)
            =DDEReset()
            ProjResult=DDEExecute(ProjChan,'Macro "PMG_ACTIVATE_PROJECT"',"DDEDone") && Bring
Project to the foreground
            =DDEWait(ProjResult,AppActive,.t.)
            =DDETerminate(ProjChan)                                          && End the DDE Conversation
with Project
        EndIF
    EndIF
    =Close(PlanDBF)
    =Close(SaveDBF)
    =Close('New')
    =Close('Old')
    Dele File (PlanDBF)
    Dele File (SaveDBF)
```

| Planwiz.prg | Page 9 |

```
       Clear Read                                                        && Get Out Of
here
       Wait Clear
Return Procedure MPP2DBF
Parameters pMPPFile, pDBFFile
  Set Message to 'Retreiving Plan Template...'
  If File(pDBFFile)                                                      && IF that File
is around
     Delete File (pDbfFile)                                              && Kill it off to prevent
the overwrite msg
  EndIF
  ProjResult = 1
  Do While ProjResult > 0
     =DDEReset()
     ProjResult=DDEExecute(ProjChan,'WindowActivate WindowName:="'+pMppFile+'"',"DDEDone")
     = DDEWait(ProjResult*-1,TemplateOpen)
  EndDo
  =DDEReset()
  ProjResult=DDEExecute(ProjChan,'FileOpen Name:="'+pMppFile+'"',"DDEDone")    && Open The
selected Project
  =DDEWait(ProjResult,FileOpen)
  =DDEReset()
  ProjResult=DDEExecute(ProjChan,'FileSaveAs
Name:="'+pDBFFile+'"',Format:=13,Backup:=False,readOnly:=False,TaskInformation:=True,Filtered:=Fals
e,Table:="PMG_EXPORT"',"DDEDone")
  =DDEWait(ProjResult,DBFSave)
  =DDEReset()
  ProjResult=DDEExecute(ProjChan,'FileClose(0)',"DDEDone")               &&
Close the File
  =DDEWait(ProjResult,FileClose)
*  Do While !File(pDBFFile)
*    Wait Window " Timeout .5
*    IF File(pDBFFile)
*       Exit
*    EndIF
*  EndDo
Return Procedure ValidateStructure
Parameters pDBFFile
  Set Message To 'Validating Template File Structure...'
  Use (pDBFFile) Alias Old in 0
  Select Old
  TmpFile=MakeTmpFile()
  Copy Structure Extended to (TmpFile)
  Sele 0
  Use (TmpFile) Alias Struct
  StructureOk = FindFld('EI') and FindFld('EO') and FindFld('EQ') and FindFld('ILF') and FindFld ('EIF') and FindFld('Add') and FindFld('Change') and FindFld('Delete') and FindFld('Dynamic') and
FindFld('Preds') and FindFld('Successors')
```

44

| Planwiz.prg | Page 10 |

```
   IF !StructureOk
           Wait Clear
        =Msg(304)&& Box("Template File Structure is Invalid.  Only plans built through the plan builder can be
used.','Template Structure Invalid','Exclamation',1)
   EndIF
   Use in Struct
   Delete File (TmpFile)
Return StructureOK Function FindFld
Parameters pFldName
   FldName = Upper(Alltrim(pFldName))
   Locate  For Upper(Alltrim(Field_name)) = FldName
   IF !Found()
        =OurMsgBox(Chr(13)+'Missing Field '+pFldName,'Field Not Found','Exclamation',1)
   EndIF
Return Found()

Procedure DBF2MPP
Parameters pDBFFile, pMPPFile
   Set Message to 'Saving Project Plan...'
   ***************************************************************
   * Project 4.0 has a bug in its converter that wont let Fox Tables be reimported *
   * So we have to convert the DBF to a CSV (Comma Seperated Value) File
   * and Import it in that format, Comma Delimited Files Wont WOrk either
   * So we have to build the CSV File by Hand
   *
   ***************************************************************
   Select New
   LastDot = Occurs('.',pDBFFile)
   CSVFile = Left(pDBFFile,At('.',pDBFFile,LastDot))+'CSV'
   IF File(CSVFile)                                              && IF that CSV File
Exists,
       Delete File (CSVFile)                                     && Delete It to prevent the
overwrite msg
   EndIF
   =WriteCSVFile(CSVFile)                                        && Write out the CSV File
   =DDEReset()
   ProjResult=DDEExecute(ProjChan,'FileNew SummaryInfo:=False',"DDEDone") && Make A New File in
Project
   =DDEWait(ProjResult,FileNew)
   =DDEReset()
   ProjResult=DDEExecute(ProjChan,'FileOpen
Name:="'+CSVfile+'",ReadOnly:=False,Merge:=1,TaskInformation:=True,Table:="PMG_EXPORT"',"DDED
one")
   =DDEWait(ProjResult,OpenCSV)
   =DDEReset()
   ProjResult=DDEExecute(ProjChan,'FileSaveAs Name:="'+pMPPFile+'"',"DDEDone") && Save it as an
MPP File
   =DDEWait(ProjResult,FileSave)
   IF File(CSVFile)                                              && IF that CSV File
Exists,
      Delete File (CSVFile)                                      && Clean It Up
```

45

| Planwiz.prg | Page 11 |

```
    EndIF
    Return

Procedure StartProject
Set Message to 'Attempting To Launch Microsoft Project...'
    =DDESetOption('Safety',.f.)        && Dont ask to start winproj if it isnt already running
    ProjChan = DDEInitiate("winproj","system") && Check to see if Winproj is already running
    IF ProjChan = -1                   && if Winproj isnt already running
      HadToStartProj = .t.             && Throw the Kickstart Flag
        Runit = .f.                    && Initialze the Success Flag
      ExecPath = Space(20)    && Initiailze the execution path
          ExecPath = ReadIni('Extensions','mpp') && Search the Ini for the MPP Registration
      ExecPath = Left(ExecPath,At('^',ExecPath)-1) && Parse out the execution path
          IF Empty(ExecPath)           && If you didnt find Project in the INI file
            ExecPath=Getfile('EXE','Where is Winproj.exe?','Locate') && Ask the user for it
          EndIF
      IF Empty(ExecPath)               && If it wasnt in th Ini File, and the user doesnt
know
          Wait Window "Could Not Locate Microsoft Project. Program execution will end" timeout 3
          Set Message to ' '        && Get Out
          Return .f.
      EndIF
      *Runit = ourmsgbox(Chr(13)+'Launch Microsoft Project?','Confirm Program Launch','Question',4)
=1
      Runit = .t.                      && IF you found it, Then Run it
      IF RunIt
          CMD = "RUN /N7 "+ExecPath    && Start up a Project Session Minimized w/o focus
          &Cmd
      EndIF
      ProjChan = DDEInitiate("winproj","system") && Initiate the conversation
    Else                    && Winproj is already running
      Runit = .t.
    EndiF
    Set Message to ' '
    Return Runit

* ReadIni - read the WIN.INI file
* Returns a WIN.INI entry 'tcEntry' from section 'tcSection'
* or blank if not found
Function ReadIni
parameters tcSection, tcEntry
      private lcRetVal, llLibSet, lnHandle, lnRetLen
      llLibSet = ("FOXTOOLS"$UPPER(SET("LIBRARY")))
      if not llLibSet
        set library to sys(2004)+"FOXTOOLS.FLL" additive
      endif
      lnHandle = RegFn("GetProfileString","CCC@CI","I")
      lcRetVal = SPACE(255)
      lnRetLen = CallFn(lnHandle,tcSection,tcEntry," ",@lcRetVal, len(lcRetVal))
      if not llLibSet
        release library Sys(2004)+"FOXTOOLS.FLL"
      endif
return left(lcRetVal,lnRetLen)
```

46

| Planwiz.prg | Page 12 |

```
Procedure GetCompons
    SelApplID = Left(SelProj,10)
    SelProjID = Substr(SelProj,14,10)
    IF USED('FPCOMPON')
      Use IN FPCOMPON
    ENDIF
    =Kill('ProjCOmp')
    PlacedROLock = GetForRo('Proj',SelApplID,SelProjID,'0')     && Tell the system you're using this proj
for read only
    IF PlacedROLock > 0
      USE (mkCmpFil('Proj',SelApplID,SelProjID,'0')) Alias FPCOMPON in 0
      TmpTable = TempFile()
              Select Comp_ID,Comp_Desc,Type,Action ;
          From FPCOMPON ;
             Into Table (TmpTable)
             Use (Dbf()) Alias ProjComp
          IF RecCount('ProjComp') = 0
         =Msg(305) && Box('The Selected Project Has No Components To Merge with the Project Plan
Template.','No Components Found','Info',1)
              EndIF
              IF PlacedROLock = 1
            =ReleasRO('Proj',SelApplID,SelProjID,'0')   && Release the RO Lock on this Record
          EndIF
    Else
        =OurMsgBox('Unable To Gather Component Information About This Project','Could Not Read
Record','Exclamation',1)
          Return .f.
    EndiF
    IF Used('FPCOMPON')
              Use in FPCOMPON
    EndiF
Return .t.

Procedure WriteCSVFile
Parameter pCSVFile
  OldSafety = Set('Safety')
  Set Safety OFF
  Set TextMerge on NoShow
  Set TextMerge Delimiters To
  Set TextMerge to (pCSVFile)
  Select New
  TmpFile=TempFile()
  Copy Structure Extended to (TmpFile)
  Sele 0
  Use (TmpFile) Alias Struct
  Select New
  Locate For .t.
  Scan
    Select Struct
    Locate For .t.
    FirstTime = .t.
```

47

| Planwiz.prg | Page 13 |

```
      Scan
        If FirstTime
          FirstTime = .f.
        Else
          \\,
        EndIF
        FldName = 'New.'+Alltrim(Struct.Field_Name)
        FldContents = &FldName
        Do Case
          Case Struct.Field_Type = 'C'
                FldContents = Alltrim(FldContents)
          Case Struct.Field_Type = 'N'
            FldContents = Alltrim(Str(FldContents,10,0))
          Case Struct.Field_Type = 'F'
            FldContents = Alltrim(Str(FldContents,10,2))
        EndCase
        IF Struct.Field_Type = 'C' and AT(',',FldContents) <> 0
          \\<<Chr(34)+FldContents+Chr(34)>>
        Else
          \\<<FldContents>>
        EndIF
      EndScan
      \
      Select New
    EndScan
    Set TextMerge To
    IF Used('Struct')
      Use In Struct
    EndIF
    IF File(TmpFile)
      Delete File (TmpFile)
    EndIF
    Set Safety &OldSafety
    Return Function RuleCheck
    * Sets the Component and Action flags of the subordinate Tasks
    * to that of their dynamic summary task
      Set Message to 'Scanning For Rule Violations..'
      SetSubords = .f.
      Select Old
      Locate For .t.
      Scan
        IF SetSubords and Old.Outln_lvl = SummaryLevel
          SetSubords = .f.
          Skip -1
          Loop
        EndIF
        If !SetSubords and Old.Summary = 'Yes' and Old.Dynamic = 'Yes'
          SummaryLevel = Old.Outln_lvl
          SetSubords = .t.
          Scatter Memvar Fields Dynamic,Ei,Eo,Eq,Iif,Eif,Add,Change,Delete
```

| Planwiz.prg | Page 14 |

```
     m.dynamic = 'No'
    Loop
   EndIF
   IF SetSubords
     Gather memvar Fields Dynamic,Ei,Eo,EQ,ILF,EIF,ADD,Change,Delete
   EndIF
 EndScan
 Set message to ' '
Return Function Close
Parameters pFileName
 IF Used(pFileName)
   Use in (pFileName)
 EndIF
Return Function Open
Parameters pFileName
 IF !Used(pFileName)
   Use (pFilename) in 0
 EndIF
Return Function MakeTmpFile
  TempDir = Alltrim(Sys(2023))+IIF(Right(Alltrim(Sys(2023)),1) <> '\','\','')
  TmpFile = Tempdir+sys(3)+'.DBF'
  Do While File(TmpFile)
     TmpFile = Tempdir+sys(3)+'.DBF'
  EndDo
Return TmpFile Procedure SetupMSProject
Parameters ProjectInstalled
  Private YesMarkerFile,ProjectPath,OldErr,TestRightsFile
  YesMarkerFile = "MSPROJLNK.DND"
  AccessRights = .t.
  ProjectPath = ReadIni('Extensions','mpp')
  IF !Empty(ProjectPath)
    ProjectPath = left(ProjectPath,RAT('\',ProjectPath))
  EndIF
  Set TextMerge On NoShow
  OldErr = On('Error')
  On error Do NoAccessRights with AccessRights
  TestRightsFile = Sys(3)+'.TMP'
  Set TextMerge To (ProjectPath+TestRightsFile)
  Set TextMerge To
  If !AccessRights
    Set Library To
```

49

| Planwiz.prg | Page 15 |

```
=Msg(306)&&Box('You Must Have Write Privledges to the directory where MS Project is installed
Before The Project Extensions can be installed.','Insufficient Access Rights','Exclamation',1)
    Return .f.
  Else
    Delete File (ProjectPath+TestRightsFile)
  EndIF
  On Error &OldErr
  ProjectInstalled = !Empty(ProjectPath)
  IF ProjectInstalled
      If !File(ProjectPath+YesMarkerFile)
                  IF m.ShowBit
                     @ 0,0  Say "InstLink.BMP" Bitmap Center
                  Else
                     Wait Window "Installing Productivity Manager Extensions in Microsoft Project..."
Nowait
                  EndIF
        IF InstLink()
                     Set TextMerge On NoShow
                     Set TextMerge to (ProjectPath+YesMarkerFile)
                        \ Microsoft Project Extensions Have Been Installed
                     Set TextMerge TO
                     Clear
                   Wait Clear
                   Do Header with 'All'
                 Else
                   Clear
                   Wait Clear
                   Do Header with 'All'
                   Return .f.
                EndIF
             EndIF
  Else
     Wait Clear
     =Msg(307)&&Box('Microsoft Project Could Not Be Found On Your System. You Must Install
Microsoft Project To Access The Project Management Functions.','MS Project Not Found','Info',1)
  EndIF
Return Function DDEReset
  DDEContinue = .f.
Return Function DDEDone
Parameters
Parm1,Parm2,Parm3,Parm4,Parm5,Parm6,Parm7,Parm8,Parm9,Parm10,Parm11,Parm12,Parm13,Parm1
4,Parm15,Parm16,Parm17,Parm18,Parm19,Parm20,Parm21,Parm22,Parm23,Parm24,Parm25
  DDEContinue = .t.
Return .t.

Function DDEWait
Parameters ProjResult,FailedCommand,QuietMode
  CommandExecuted = ProjResult >= 0
  TimedOut = .f.
```

50

| Planwiz.prg | Page 16 |

```
IF CommandExecuted
  StartTime = Seconds()
        Do While !DDEContinue and !Timedout
                TimedOut =Seconds() >StartTime+DDETimeOut
        EndDo
EndIF
IF (!CommandExecuted Or TimedOut) and Type('FailedCommand') = 'C' and DDEErrorFree and
!QuietMode
        DDEErrorFree = .F.
  Do Case
    Case FailedCommand = ExitProj and !ProjIsRunning()
                                        * Project Isnt Running, Don't Say Anything
    Case ProjIsRunning()
        =OurMsgBox(UnableMsg+FailedCommand+AssistMsg+SwitchMsg,TitleMsg+'
('+IIF(TimedOut,'T','F')+')','Exclamation',1)
        DDEErrorFree=Msg(308) = 1 &&Box(Chr(13)+'Continue Processing?','Project Planning
Wizard','Question',4) = 1
    Case !ProjIsRunning()
        =OurMsgBox(UnableMsg+FailedCommand+NotRunMsg,TitleMsg,'Exclamation',1)
  EndCase
EndIF
Return Function ProjIsRunning
  Private TstChan
  TstChan = DDEInitiate('WINPROJ','SYSTEM')
  =DDETerminate(TstChan)
Return TstChan >= 0

Procedure NoAccessRights
Parameters AccessRights
  AccessRights = .f.
Return

Procedure W_Help
Parameters PageNum
Return PageNum = TabStpBut

Procedure V_Help
Parameters PAgeNum
  Help Planning Wizard
Return

Procedure SetKeys
Parameters pMode
  pMode = Upper(Alltrim(pMode))
  Do Case
    Case pMode = 'GLOBAL'
      On Key Label F1 Do V_Help
  EndCase
Return
```

51

| Planwiz.prg | Page 17 |
|---|---|

```
Function TempFile
  Private TempDir,TmpFile
  TempDir = Alltrim(Sys(2023))+IIF(Right(Alltrim(Sys(2023)),1) <> '\','\','')
  TmpFile = Tempdir+sys(3)+'.TMP'
  Do While File(TmpFile)
    TmpFile = Tempdir+sys(3)+'.TMP'
  EndDo
Return TmpFile Function Kill
Parameters File2Kill
  If Used(File2Kill)
    Select (File2Kill)
    DBFFile = DBf()
    Use
    Delete File (DBFFILE)
  EndIF
Return
```

We claim:

1. A system for generating a work breakdown structure for a project comprising in combination:

means for storing function point component information;
means for storing work task information;
processing means for combining said function point component information and said work task information and producing an output comprising combined function point component information and work task information, and
means for storing said output.

2. The system according to claim 1 wherein said means for storing said function point component information comprises one or more files.

3. The system according to claim 1 wherein said means for storing said work task information comprises one or more files.

4. The system according to claim 1 wherein said means for storing said combined output comprises one or more files.

5. The system according to claim 1 wherein said means for storing function point component information and said means for storing work task information include means for storing information common to said function point component information and said work task information.

6. The system according to claim 5 wherein the information common to said function point component information and said work task information includes function point component type information.

7. The system according to claim 5 wherein the information common to said function point component information and said work task information is function point component action information.

8. The system according to claim 1 wherein said work task information stored in said means for storing work task information includes resource information.

9. The system according to claim 8 wherein said resource information is a member selected from the group consisting of resource type, and resource category.

10. The system according to claim 8 wherein said resource information is associated with one or more work tasks.

11. The system according to claim 1 wherein said work task information includes work task relationship information.

12. The system according to claim 11 wherein said work task relationship information is a member selected from the group consisting of predecessor information, and successor information.

13. The system according to claim 1 wherein said processing means for combining said function point component information and said work task information and producing a combined output comprises:

means for reading work task information from said means for storing work task information said means for reading work task information coupled to said means for storing work task information;
means for selecting function point component information from said means for storing function point component information based on said function point component type field, and
means for constructing a list of function point components having the same function point component type and action.

14. A system directed by computer hardware for producing a work breakdown structure for a project comprising:

One or more files for storing project task information;
One or more files for storing function point component information;
processing means for combining project task information stored in said one or more files for storing project task information with function point component information stored in said one or more files for storing function point component information and producing an output comprising combined project task information and function point component information;
said processing means coupled to said one or more files for storing project task information and said one or more files for storing function point component information, and
one or more files for storing said output, said processing means being coupled to said one or more files for storing said output.

15. The system according to claim 14 further comprising means for storing information at the application level wherein an application comprises a collection of automated procedures and data supporting business objectives, said one or more files for storing said output being coupled to said means for storing information at the application level.

16. The system according to claim 14 wherein said processing means includes means for converting a format of said one or more files for storing said output to a format of said means for storing information at the application level.

17. The system according to claim 14 further comprising display means for displaying to an operator the contents of said one or more files for storing said output.

18. The system according to claim 17 wherein said display means is coupled to said one or more files for storing said output.

19. The system according to claim 15 further comprising display means for displaying said output to an operator, said display means coupled to said means for storing information at the application level.

20. A method for producing a work breakdown structure for a project comprising the steps of:

a) storing function point component information;
b) storing project task information separately from the stored function point component information;
c) combining the function point component information with the project task information to produce an output comprising combined function point component and project task information, and
d) storing said output.

21. The method of claim 20 wherein said function point component information is stored in one or more files.

22. The method of claim 20 wherein said project task information is stored in one or more files.

23. The method of claim 20 wherein said output is stored in one or more files.

24. The method of claim 20 wherein said means for storing function point component information and said means for storing project task information include means for storing common information and wherein the combining step described in step c includes a step of associating the stored project task information with the stored function point component information on the basis of the common information.

25. The method of claim 24 wherein the function point component information includes a list of function point components, the project task information includes a list of project tasks and step c comprises the steps of:

c) reading said list of project tasks;

d) for each entry in said list of project tasks, selecting associated function point components on the basis of said common information stored in said means for storing common information and producing a list of associated function point components for each entry on said list of project tasks;

e) exploding each entry on said list of project tasks such that each project task is replicated for every function point component on said list of associated function point components.

26. The method of claim 25 wherein step e includes assigning a unique identification number to each project task.

27. The method of claim 20 further comprising a step of displaying said output to an operator.

28. A computer readable storage mechanism comprising:

computer readable means for storing computer programs, information and data comprising:
  a WBS computer program;
  project task information;
  function point component information;
  one or more files for storing an output;
  wherein execution of said WBS computer program causes said project task information to be combined with said function point component information to produce work breakdown structure information.

29. The computer readable storage mechanism of claim 28 wherein execution of said WBS program causes said work breakdown structure information to be stored in said one or more files for storing an output.

30. The computer readable storage mechanism of claim 28 wherein said computer readable means for storing computer programs, information and data is a member selected from the group consisting of magnetic storage media, optical storage media, and magneto-optical storage media.

31. The computer readable storage mechanism of claim 30 wherein said magnetic storage media includes one or more floppy disks.

32. The computer readable storage mechanism of claim 30 wherein said magnetic storage media includes a hard disk.

33. The system according to claim 1 wherein said means for storing said function point component information comprises one or more files, said means for storing work task information comprises one or more files and means for storing said output comprises one or more files.

34. The method of claim 20 wherein said function point component information is stored in one or more files, said project task information is stored in one or more files and said output is stored in one or more files.

* * * * *